(12) United States Patent
Malekos et al.

(10) Patent No.: US 10,814,490 B2
(45) Date of Patent: Oct. 27, 2020

(54) TARGETS AND PROCESSES FOR FABRICATING SAME

(71) Applicant: Board of Regents of the Nevada System of Higher Education, on behalf of the University of Nevada, Reno, Reno, NV (US)

(72) Inventors: Steven Malekos, Reno, NV (US); Grant Korgan, Reno, NV (US); Jesse D. Adams, Reno, NV (US)

(73) Assignee: Board of Regents of the Nevada System of Higher Education, on behalf of the University of Nevada, Reno, Reno, NV (US)

( * ) Notice: Subject to any disclaimer, the term of this patent is extended or adjusted under 35 U.S.C. 154(b) by 286 days.

(21) Appl. No.: 15/870,470

(22) Filed: Jan. 12, 2018

(65) Prior Publication Data

US 2018/0194011 A1 Jul. 12, 2018

Related U.S. Application Data

(60) Continuation of application No. 14/319,592, filed on Jun. 30, 2014, now Pat. No. 9,895,811, which is a
(Continued)

(51) Int. Cl.
*H05G 2/00* (2006.01)
*B25J 11/00* (2006.01)
(Continued)

(52) U.S. Cl.
CPC ............ *B25J 11/00* (2013.01); *F16M 13/022* (2013.01); *H01J 40/16* (2013.01); *H05G 2/00* (2013.01);
(Continued)

(58) Field of Classification Search
CPC .............. H05H 6/00; B25J 11/00; H05G 2/00
See application file for complete search history.

(56) References Cited

U.S. PATENT DOCUMENTS

| 3,867,637 A | 2/1975 | Braun et al. |
| 3,992,633 A | 11/1976 | Braun et al. |

(Continued)

FOREIGN PATENT DOCUMENTS

| EP | 1234799 | 8/2002 |
| JP | 2002004037 | 1/2002 |

(Continued)

OTHER PUBLICATIONS

Adams et al., Cone Fabrication, Nanomechanics University of Nevada, Reno, Oct. 19, 2004, pp. 1-6.
(Continued)

*Primary Examiner* — Dani Fox
(74) *Attorney, Agent, or Firm* — Klarquist Sparkman, LLP

(57) ABSTRACT

In one embodiment, the present disclosure provides a target or mold having one or more support arms coupled to a substrate. The support arm can be used in handling or positioning a target. In another embodiment, the present disclosure provides target molds, targets produced using such molds, and a method for producing the targets and molds. In various implementations, the targets are formed in a number of disclosed shapes, including a funnel cone, a funnel cone having an extended neck, those having Gaussian-profile, a cup, a target having embedded metal slugs, metal dotted foils, wedges, metal stacks, a Winston collector having a hemispherical apex, and a Winston collector having an apex aperture. In yet another embodiment, the present disclosure provides a target mounting and alignment system.

21 Claims, 34 Drawing Sheets

Related U.S. Application Data division of application No. 12/918,292, filed as application No. PCT/US2009/034527 on Feb. 19, 2009, now abandoned.

(60) Provisional application No. 61/029,909, filed on Feb. 19, 2008, provisional application No. 61/030,941, filed on Feb. 22, 2008, provisional application No. 61/030,942, filed on Feb. 23, 2008, provisional application No. 61/030,945, filed on Feb. 23, 2008.

(51) Int. Cl.

| F16M 13/02 | (2006.01) |
|---|---|
| H05H 1/46 | (2006.01) |
| H01J 40/16 | (2006.01) |
| H05H 6/00 | (2006.01) |

(52) U.S. Cl.
CPC ............... *H05H 1/46* (2013.01); *H05H 6/00* (2013.01); *Y10T 428/26* (2015.01); *Y10T 428/265* (2015.01); *Y10T 428/31678* (2015.04)

(56) References Cited

U.S. PATENT DOCUMENTS

| 4,034,032 | A | 7/1977 | Hendricks |
|---|---|---|---|
| 4,198,283 | A | 4/1980 | Class et al. |
| 4,323,420 | A | 4/1982 | Masnari et al. |
| 4,381,963 | A | 5/1983 | Goldstein et al. |
| 4,455,504 | A | 6/1984 | Iverson |
| 4,544,520 | A | 10/1985 | Farnum et al. |
| 4,618,972 | A | 10/1986 | Georgiou et al. |
| 4,700,371 | A | 10/1987 | Forsyth et al. |
| 5,621,780 | A | 4/1997 | Smith et al. |
| 5,687,600 | A | 11/1997 | Emigh et al. |
| 5,776,374 | A | 7/1998 | Newsham et al. |
| 5,787,146 | A | 7/1998 | Giebeler |
| 5,878,110 | A | 3/1999 | Yamamoto et al. |
| 5,923,637 | A | 7/1999 | Shimada et al. |
| 6,275,565 | B1 | 8/2001 | Tomie |
| 6,332,017 | B1 | 12/2001 | Carroll et al. |
| 6,464,844 | B1 | 10/2002 | Piculo et al. |
| 6,594,335 | B2 | 7/2003 | Davidson |
| 6,770,154 | B2 | 8/2004 | Koenigsmann et al. |
| 6,969,472 | B2 | 11/2005 | Vezenov et al. |
| 7,200,203 | B2 | 2/2007 | Cocks et al. |
| 7,351,607 | B2 | 4/2008 | Wang et al. |
| 7,555,102 | B1 | 6/2009 | Renard-LeGalloudec |
| 8,229,075 | B2 | 7/2012 | Cowan et al. |
| 8,530,852 | B2 | 9/2013 | Le Galloudec |
| 8,750,459 | B2 | 6/2014 | Cowan et al. |
| 2002/0090194 | A1 | 7/2002 | Tajima |
| 2004/0100893 | A1 | 5/2004 | Germishuizen et al. |
| 2005/0070035 | A1 | 3/2005 | Yazaki et al. |
| 2006/0039520 | A1 | 2/2006 | Takahashi |
| 2007/0007469 | A1* | 1/2007 | Murakami ............ B82Y 10/00 250/493.1 |
| 2007/0019789 | A1 | 1/2007 | Bloom |
| 2008/0073982 | A1 | 3/2008 | Ono et al. |
| 2010/0028707 | A1 | 2/2010 | Cowan et al. |
| 2012/0298624 | A1 | 11/2012 | Cowan et al. |
| 2014/0030542 | A1 | 1/2014 | Adams et al. |
| 2015/0328777 | A1 | 11/2015 | Malekos et al. |

FOREIGN PATENT DOCUMENTS

| WO | WO2007/033060 | 3/2007 |
|---|---|---|
| WO | WO2009/105546 | 8/2009 |

OTHER PUBLICATIONS

Adams et al., Hemisphere Fabrication, Nanomechanics University of Nevada, Reno, Oct. 19, 2004, pp. 1-4.

Artman, Office Action dated Mar. 4, 2013 in U.S. Appl. No. 13/418,003.
Artman, Office Action dated May 18, 2011, in U.S. Appl. No. 12/066,479.
Akira, O., Manufacturing Method of Sputtering Target and Sputtering Apparatus, English abstract of JP 2002004037, Jan. 9, 2002.
Baharlou, S., International Preliminary Report on Patentability for PCT/US2006/035267, dated Mar. 18, 2008.
Bak, J., International Search Report for PCT/US2009/034527, dated Sep. 23, 2009.
Bak, J., Written Opinion of the International Searching Authority for PCT/US2009/034527, dated Sep. 23, 2009.
Baldelli, et al., Quasi-monochromatic x-rays for diagnostic radiology, Physics in Medicine and Biology, 2003, 48:3653-3665.
Basov, N.G., et al., Conditions for heating up of a plasma by the radiation from an optical generator, Soviet Physics JETP, Jul. 1964, 19(1): 123-125.
Bin, J.H., et al., Influence of the target front-surface curvature on proton acceleration in laser-foil interaction, Physics of Plasmas, Apr. 20, 2009, 16(4):043109-1 to 043109-5.
Borghesi, M., et al., Electric filed detection in laser-plasma interaction experiments via the proton imaging technique, Physics of Plasmas, May 2002, 9(5) :2214-2220.
Bulanov, S.V., et al., Feasibility of using laser ion accelerators in proton therapy, Plasma Physics Reports, 2002, 28(5):453-456.
Chen, Z.L., et. al, Enhancement of energetic electrons and protons by cone guiding of laser light, Physical Review E, Mar. 16, 2005, 71(3): 036403-1 to 036403-5.
"Chirped pulse amplification," 5p. downloaded from 1:1J1;p;_//i;'. p_._w~kir-4i,~.,Qrn!.wbw,t~;-.:_...rtip?Title=Chirped _pulse_ amplificati . . . on Mar. 28, 2007.
Cowan, et al, X-ray imaging spectroscopy of Ti foils and pyramidal targets, 1, 2005.
Cowan, US-Japan Workshop on Fast Ignition, Nov. 17, 2004, 1-4.
Dawson, John M., On the production of plasma by giant pulse lasers, The Physics of Fluids, Jul. 1964, 7(7):981-987.
De Donnea, Conclusions of the Fusion Fast Track Experts Meeting, Dec. 5, 2001, 1-5.
Ditmire, Fusion Science Center Research at UT: Hot electron and x-ray generation from cone shaped targets, FI FSC progress Meeting, Jun. 2, 2005, 1-25.
Dunne, Mike, Laser-driven particle accelerators, Science, Apr. 21, 2006, 312:374-376.
Duvvuri, et al., Spectroscopic characterization of x-rays from laser produced plasmas: medical applications, Dec. 13, 2005, 1-28.
Dyer, et al., Pyramidal targets as an advanced radiation source in laser-solid interactions, 2005 Quantum Electronics and Laser Science Conference, 2005, 1804-1806.
European Fusion Development Agreement, "Cleaner Energy for the Future," 1-8.
European Communication, EP Patent Application 06803322.4, dated Sep. 17, 2015, 8 pages.
European Search Report, EP Patent Application 06803322.4, dated Jun. 26, 2014.
European Examination Report, EP Patent Application 06803322.4, dated Dec. 13, 2017, 4 pages.
Fletcher, "Microfabricated Silicon Solid Immersion Lens," Journal of Microelectromechanical Systems, vol. 10, No. 3, Sep. 2001, 450-459.
Flippo, K.A., et al., Increased efficiency of short-pulse laser-generated proton beams from novel flat-top cone targets, Physics of Plasmas, May 30, 2008, 15(5):056709-1 to 056709-12.
Fuchs, et al, "Demande de temps 2004 au LULI installation 100 TW," 2004, 1-12.
Fuchs, et al, "Demande de temps laser 2005 sur l'installation 100 TW dans le cadre du programme national d'acces aux installations du LULI," 2005, 1-5.
Fuchs, et al., Spatial uniformity of laser-accelerated ultrahigh-current MeV electron propagation in metals and insulators, Physical Review Letters, Dec. 18, 2003, 91(25):255002-1 to 255002-4.
Giffo-Schmitt, B., International Preliminary Report on Patentability for PCT/US2009/034527, Aug. 24, 2010.

(56) References Cited

OTHER PUBLICATIONS

Gratz, et al, Time-gated x-ray tomography, Applied Physics Letters, Nov. 16, 1998, 72(20):2899-2901.
Heck, Response filed Jul. 1, 2013, to office action dated Mar. 4, 2013, in U.S. Appl. No. 13/418,003.
Heck, Response filed Nov. 17, 2011, to office action dated May 18, 2011, in U.S. Appl. No. 12/066,479.
Heck, Supplemental response filed Nov. 17, 2011, to office action dated May 18, 2011, in U.S. Appl. No. 12/066,479.
Herrlin, et al., Generation of x-fays for medical imaging by high-power lasers: Preliminary results, Radiology, Oct. 1993, 189:65-68.
Higginson, et al, Flexible large batch production of high energy density physics targets, abstract submitted for the DPP06 meeting of The American Physical Society, Jul. 20, 2006, 1 page.
Ichalalene, et al., Image quality analysis for dual energy subtraction imaging with a femtosecond laser-based hard x-ray source, IEEE Journal on Selected Topics in Quantum Electronics, Nov./Dec. 2001, 7(6):912-917.
Key, et al, "Fast Ignition: Physics progress in the US fusion energy program and prospects for achieving ignition," 2002, 1-11.
Knelp, et al., K-spectroscopy and x-ray yield optimization of micro-shaped targets, 2005, 1.
Kodma, et al., Fast heating of ultrahigh-density plasma as a step towards laser fusion ignition, Nature, Aug. 23, 2001 412:798-802.
Kodma, et al., Fast plasma heating in a cone-attached geometry ignition, Nuclear Fusion, Nov. 26, 2004, 44:S276-S283.
Koenig, et al, High pressures generated by laser driven shocks: Application to planetary physics, Nuclear Fusion, Nov. 26, 2004, 44:S208-S214.
Krol, et al., Laser-based microfocused x-ray source for mammography: Feasibility study, Medical Physics, 1997, 24(5):725-732.
Landen, et al., X-ray backlighting for the National Ignition Facility, Review of Scientific Instruments, Jan. 2001, 72(1):627-634.
Lasinski, et al, Particle-in-cell simulations of short-pulse, high intensity light impinging on structured targets, Physics of Plasma, Jan. 29, 2009, 16(1):012705-1 to 012705-8.
Lazos, et al., An integrated research tool for x-ray imaging simulation, Computer Methods and Programs in Biomedicine, 2003, 70:241-251.
Lee, G., International Search Report for PCT/US2006/035267, dated Jan. 31, 2007.
Lee, G., Written Opinion of the International Searching Authority for PCT/US2006/035267, dated Jan. 31, 2007.
Nakamura et al., "Optimization of Cone Target Geometry for Fast Ignition" Oct. 11, 2007, Physics of Plasmas, vol. 14, p. 103105.
Nakamura, et al., Superthermal and efficient-heating modes in the interaction of a cone target with ultraintense laser light, Physical Review Letters, Jan. 30, 2009, 102(4):045009-1 to 045009-4.
Nakamura, et al., Surface-magnetic-filed and fast-electron current-layer formation by ultraintense laser irradiation, Physical Review Letters, Dec. 20, 2004, 93(26):265002-1 to 265002-4.
Nakatsutsumi, et al., Reentrant cone angle dependence of the energetic electron slope temperature in high-intensity laser-plasma interactions, Physics of Plasmas, May 14, 2007, 14(5):050701-1 to 050701-4.
Nishiuchi, et al., Focusing and spectral enhancement of a repetition-rated, laser-foil interaction, Physics of Plasmas, Apr. 20, 2009, 16(4):043109-1 to 043109-5.
Nod A, et al., Ion production with a high-power short-pulse laser for application to cancer therapy, Proceedings of EPAC, 2002, 2748-2750.
Nuckolls, et al., Laser compression of matter to super-high densities: Thermonuclear (CTR) applications, Nature, Sep. 15, 1972, 239:139-142.
Osenbaugh-Stewart, Office Action dated Aug. 29, 2012, in U.S. Appl. No. 12/977,475.
Osenbaugh-Stewart, Notice of Allowance/Reasons for Allowance dated May 7, 2013, in U.S. Appl. No. 12/977,475.
Park, et al, High energy K(alpha) radiography using high-intensity, short-pulse lasers, Physics of Plasmas, Nov. 29, 2005, 1-37.
Patel, et al., Isochoric heating of solid-density matter with an ultrafast proton beam, Physical Review Letters, Sep. 19, 2003, 91(12): 125004-1 to 125004-4.
Pegoraro, et al., Production of ion beams in high-power laser-plasma interactions and their application, Laser and Particle Beams, 2004, 22:19-24.
Princeton Instruments, "High-performance x-ray imaging solutions," 2004, 1-16 Rassuchine, et al., "The production of ultrafast bright K-alpha x-rays from laser produced plasmas for medical imaging," 2005, 1-2.
Rassuchine, "Laser-target experiments: Shot design," power point file created Apr. 6, 2006,1-9.
Reich, et al, Yield optimization and time structure of femtosecond laser plasma K-alpha sources, Physical Review Letters, May 22, 2000, 84(21):4846-4849.
Renard-Le Galloudec, "Developments of laser targets and operations of the target fabrication laboratory," 2005, 1-4.
Renard-Le Galloudec, "Enhanced radiation sources with pyramidal target," 2005, 1.
Renard-Le Galloudec, et al., Controlled reproducible alignment of cone targets and mitigation of preplasma in high intensity laser interactions, Review of Scientific Instruments, Aug. 25, 2008, 79(8):083506-1 to 083506-4.
Renard-Le Galloudec, et al., Developments of laser targets and operations of the target fabrication laboratory, Nevada Terawatt Facility Annual Report, 2006, 4 pages.
Renard-Le Galloudec, et al., Guiding, focusing, and collimated transport of hot electrons in a canal in the extended tip of cone targets, Physical Review Letters, May 20, 2009, 102(20):205003-1 to 205003-4.
Renard-Le Galloudec, et al., New micro-cones targets can efficiently produce higher energy and lower divergence particle beams, Laser and Particle Beams, 2010, 28:513-519.
Reyntjens, et al., Focused ion beam induced deposition: Fabrication of three-dimensional microstructures and Young's modulus of the deposited material, Journal of Micromechanics and Microengineering, 2000, 10:181-188.
Roth, et al, Energetic ions generated by laser pulses: A detailed study on target properties, Physical Review Special Topics—Accelerators and Beams, Jun. 4, 2002, 5(6):061301-1 to 061301-8.
Roth, et al., Fast ignition by intense laser-accelerated proton beams, Physical Review Letters, Jan. 15, 2001, 86(3):436-439.
Roth, et al., The generation of high-quality, intense ion beams by ultra-intense lasers, Plasma Physics and Controlled Fusion, Nov. 2, 2002, 44:B99-B108.
Rousse, et al., Efficient K-alpha x-ray source from femtosecond laser-produced plasmas, Physical Review, Sep. 1994, 50(30):2200-2207.
Schollmeier, et al., Controlled transport and focusing of laser-accelerated protons with miniature magnetic devices, Physical Review Letters, Aug. 1, 2008, 101(5):055004-1 to 055004-4.
Sentoku, et al., Isochoric heating in heterogeneous solid targets with ultrashort laser pulses, Physics of Plasmas, Dec. 4, 2007, 14(12):122701-1 to 122701-6.
Sentoku, et al., Laser light and hot electron micro focusing using a conical target, Physics of Plasmas, Jun. 2004, 11(6):3083-3087.
Sjogren, et al., High-repetition-rate, hard x-ray radiation from a laser-produced plasma: Photon yield and application considerations, Review of Scientific Instruments, Apr. 2003, 74(4):2300-2311.
Snavely, et al., Laser generated proton beam focusing and high temperature isochoric heating of solid matter, Physics of Plasmas, Sep. 21, 2007, 14(9):092703-1 to 092703-5.
Spencer, et al., Laser generation of proton beams for the production of short lived positron emitting radioisotopes, Nuclear Instruments and Methods in Physics Research B, 2001, 183:449-458.
Strzelecka, Monolithic Integration of VCSELs and Detectors with Refractive Microlenses for Optical Interconnects, UMI, Dec. 1997, 156 pages.
Svanberg, Some applications of ultrashort laser pulses in biology and medicine, Measurement Science and Technology, 2001, 12:1777-1783.
Tabak, et al., Ignition and high gain with ultrapowerful lasers, Physics of Plasmas, May 1994, 1(5):1626-1634.

(56) References Cited

OTHER PUBLICATIONS

Tanaka, et al., Basic and integrated studies for fast ignition, Physics of Plasmas, May 2003, 10(5):1925-1930.

Tonican, et al., Ultrafast laser-driven microlens to focus and energy-select mega-electron volt protons, Science, Apr. 21, 2006, 312:410-413.

Toth, et al., In-line phase-contrast imaging with laser-based hard x-ray source, Review of Scientific Instruments, 2005, 76:083701-1 to 083701-6.

Tummler, et al., High-repetition-rate chirped-pulse-amplification think-disk laser system with joule-level pulse energy, Optics Letters, Apr. 22, 2009, 34(9): 1378-1380.

Wilks, et al., Energetic proton generation in ultra-intense laser-solid interactions, Physics of Plasmas, Feb. 2001, 8(2):542-549.

Yogo, et al., Application of laser-accelerated protons to the demonstration of DNA double-strand breaks in human cancer cells, Applied Physics Letters, May 7, 2009, 94(18):181502-1 to 181502-3.

Yu, et al., High magnification imaging with a laser-based hard x-ray source, IEEE Journal of Selected Topics in Quantum Electronics, Jul./Aug. 1999, 5(4):911-915.

\* cited by examiner

FIG. 6G
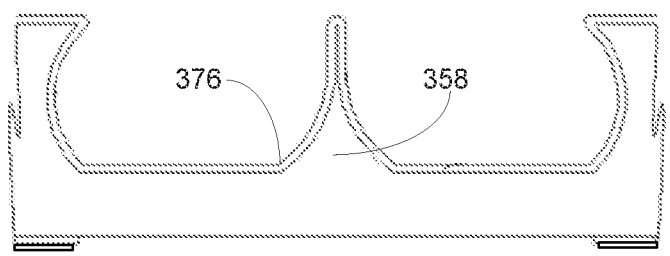
FIG. 6H
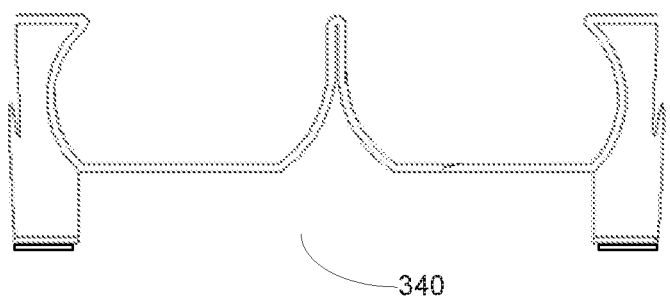
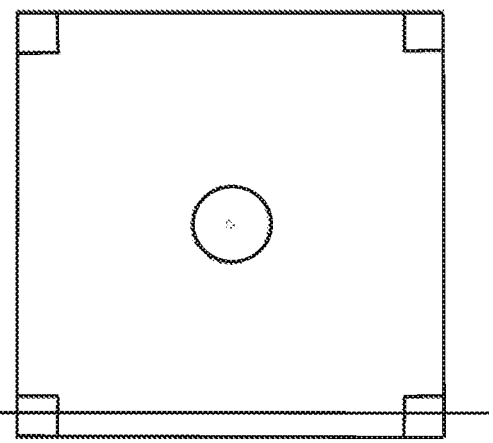
FIG. 7
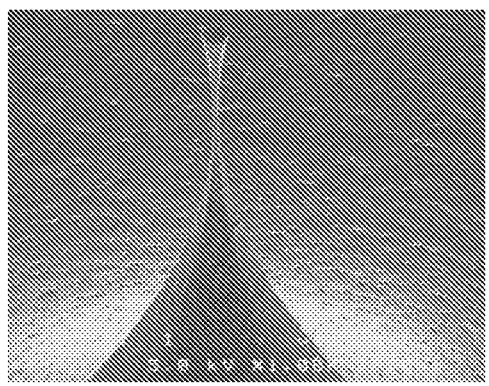
FIG. 8
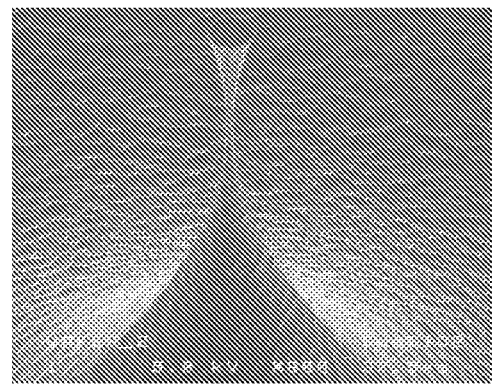
FIG. 9

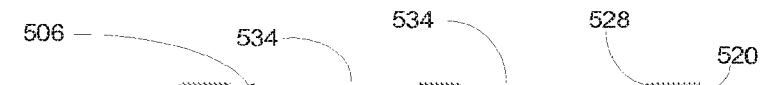
FIG. 14A
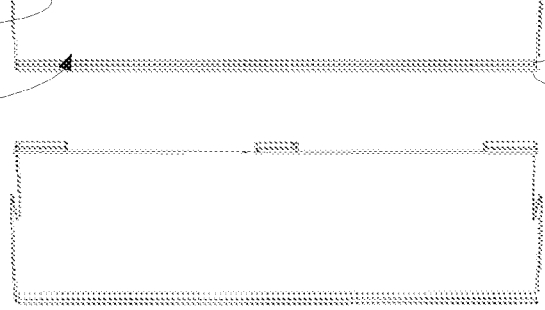
FIG. 14B
FIG. 14C
FIG. 14D
FIG. 14E
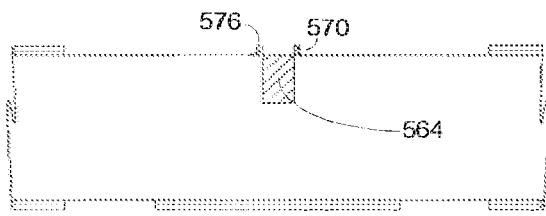
FIG. 14F
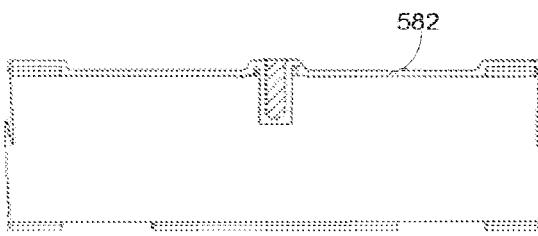

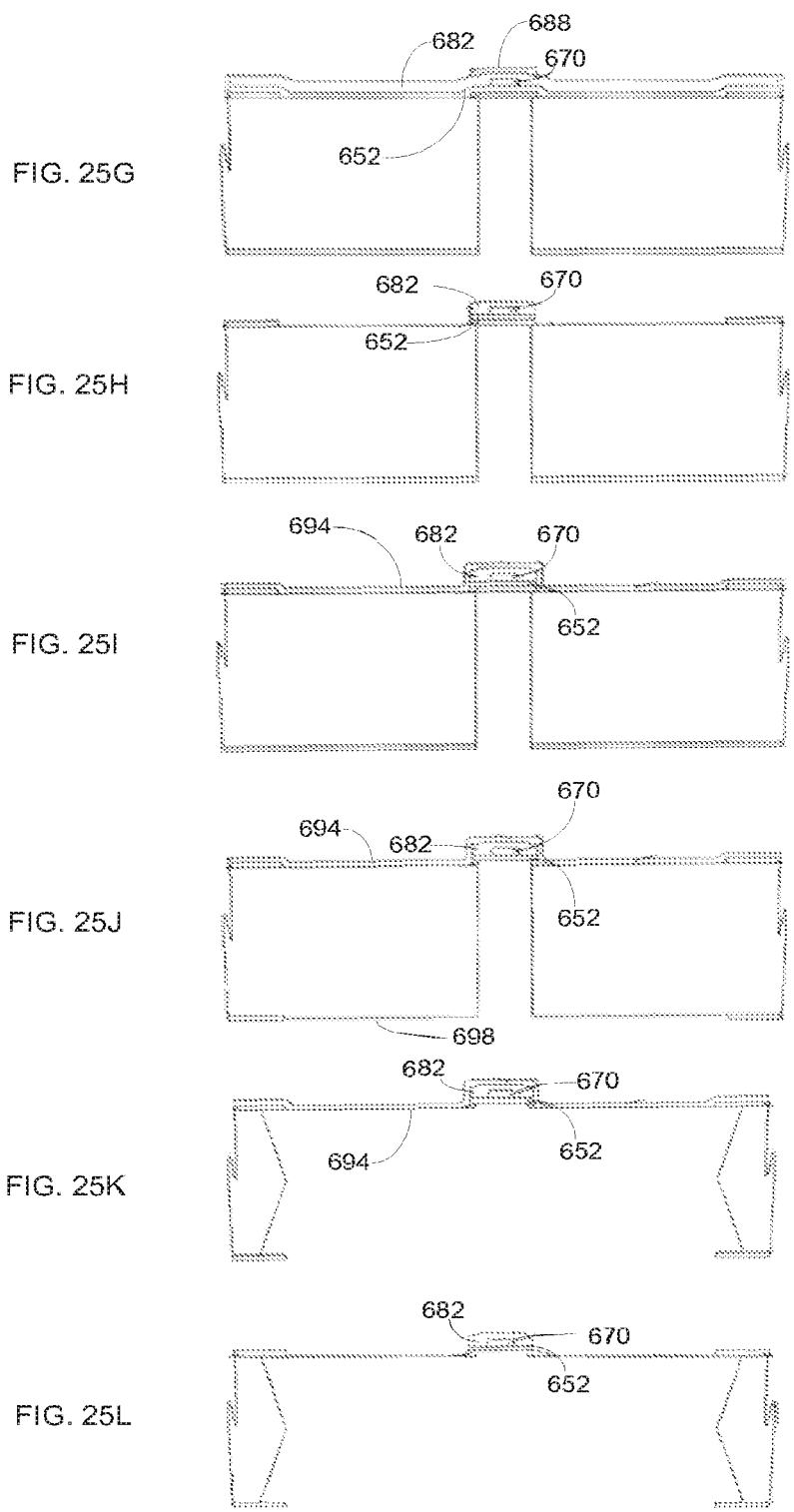

FIG. 37M
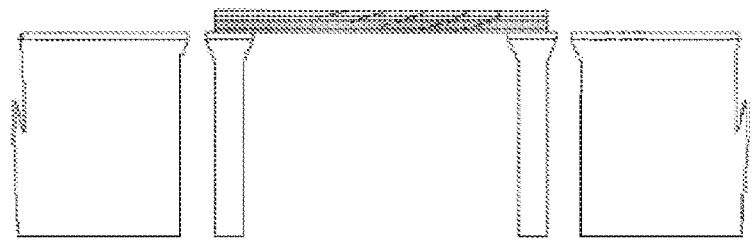
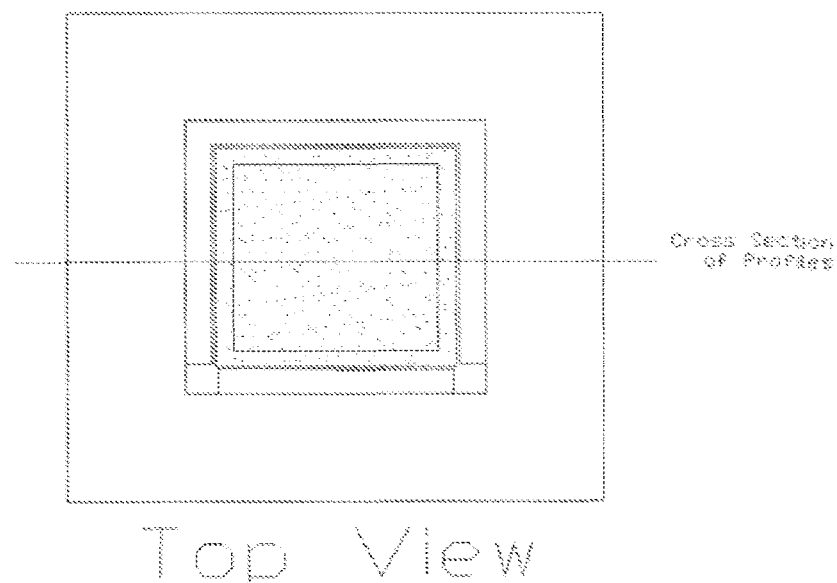
FIG. 38

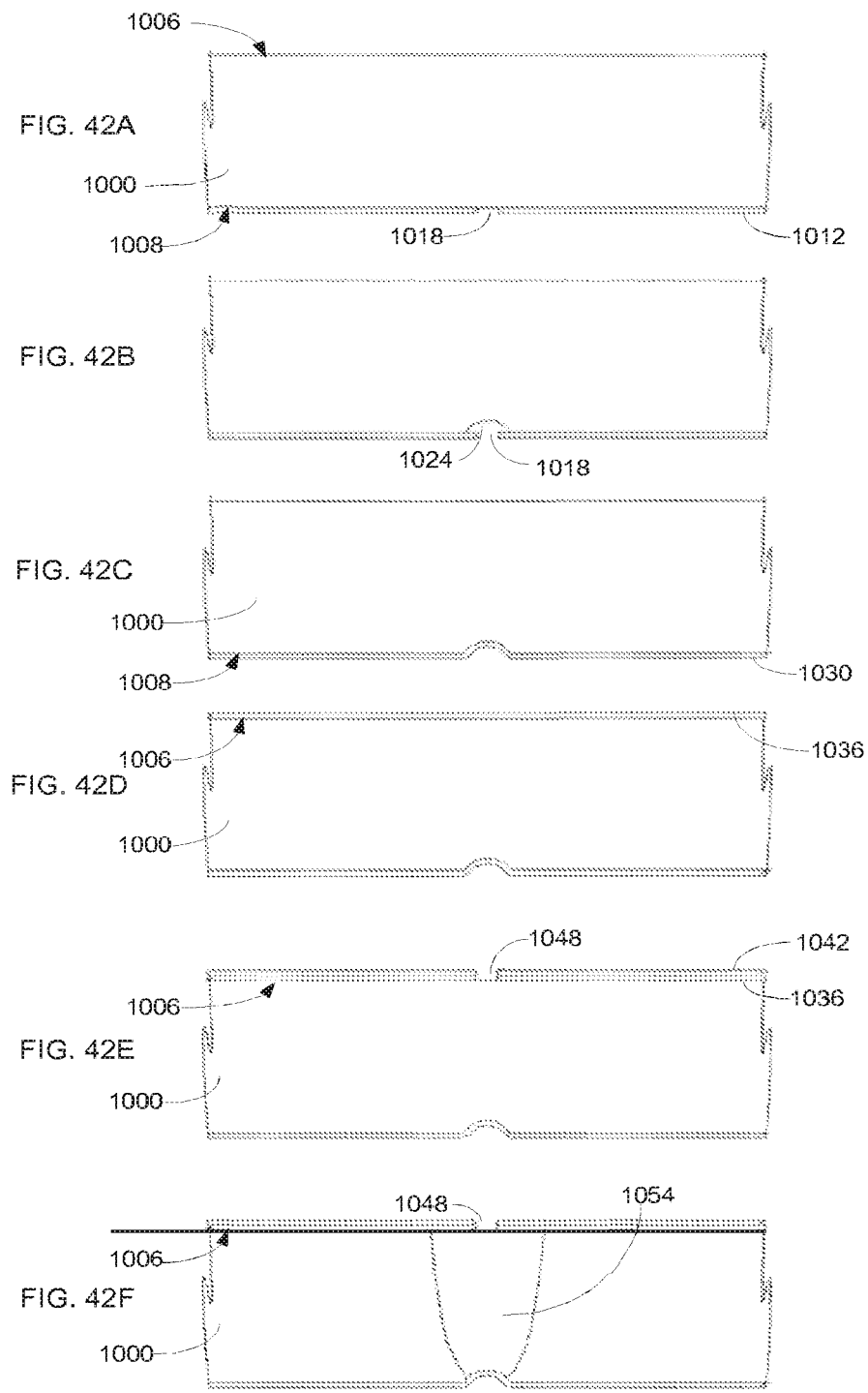

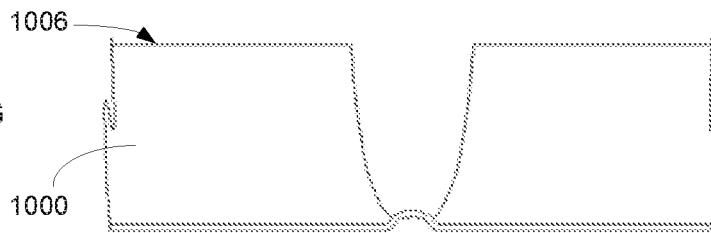
FIG. 42G
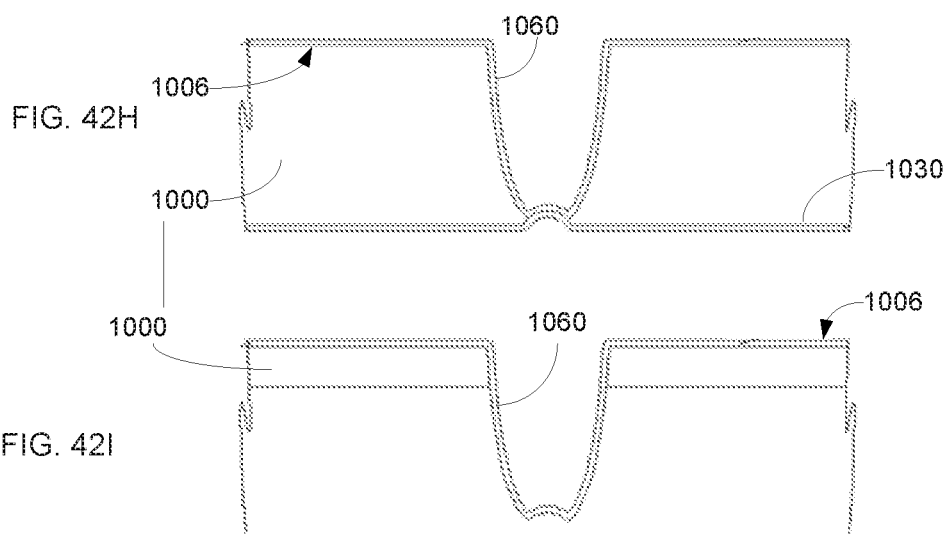
FIG. 42H
FIG. 42I
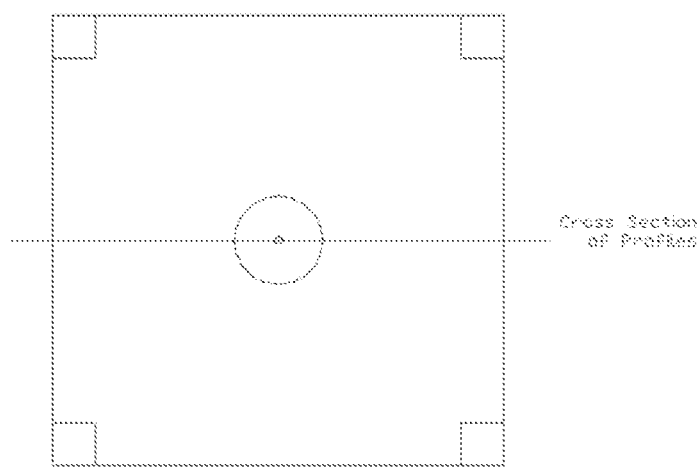
FIG. 43

FIG. 48H
FIG. 48I
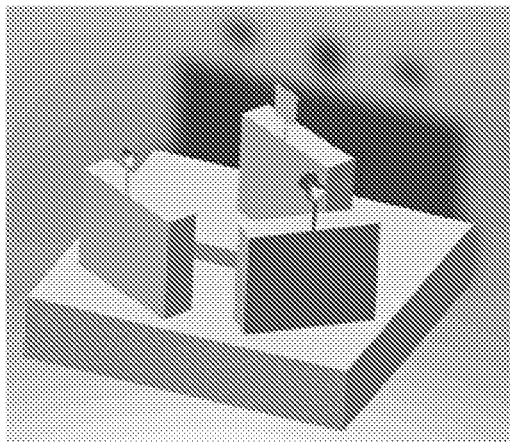
FIG. 48J

TARGETS AND PROCESSES FOR FABRICATING SAME

CROSS REFERENCE TO RELATED APPLICATIONS

This application is a continuation of U.S. patent application Ser. No. 14/319,592, filed Jun. 30, 2014, which is a divisional application of U.S. patent application Ser. No. 12/918,292, filed Aug. 18, 2010, now abandoned, which in turn is the U.S. National Stage of International Application No. PCT/US2009/034527, filed Feb. 19, 2009, which was published in English under PCT Article 21(2), which in turn claims the benefit of U.S. Provisional Patent Application Nos. 61/029,909 filed Feb. 19, 2008; 61/030,941, filed Feb. 22, 2008; 61/030,942, filed Feb. 23, 2008; and 61/030,945, filed Feb. 23, 3008. Each of these applications is incorporated by reference herein in its entirety.

ACKNOWLEDGMENT OF GOVERNMENT SUPPORT

This invention was made with government support under Grant No. DE-FC52-01NV14050 awarded by the Department of Energy. The government has certain rights in the invention.

TECHNICAL FIELD

The present disclosure relates to targets and their methods of fabrication. In particular examples, the present disclosure provide methods of fabricating metal targets useable as laser targets in high-energy laser-physics.

BACKGROUND

Metal covered targets are typically used in high energy physics applications. For examples, such targets may be shot with a laser in order to generate plasmas or high energy radiation. Such targets may be used in applications such as inertial confinement fusion.

Laser targets used to produce plasma and radiation typically have disadvantages. For example, such targets are typically manufactured individually and thus can be comparatively expensive. The expense of the targets may limit the number of targets available for use, thus potentially limiting how the targets can be used. For example, a limited number of targets available for a series of experiments may limit the quality or quantity of data obtained during the experiments.

In addition, laser targets typically require great care in handling and mounting, which can be time consuming and further limit how the targets may be used. For example, difficulties in mounting and handling targets can preclude uses that require rapid sequential target irradiation.

The comparatively large size of prior targets, and surface irregularities, may interfere with full characterization of the produced plasma. Excessive target material may also interfere with optimal energy production.

Some prior experiments have used metal coated silicon targets. However, the silicon included in such targets typically interferes with energy focusing and radiation enhancement.

SUMMARY

As described in more detail below, various aspects of the present disclosure provide molds and metal shapes formed using such molds that can be used, for example, as laser targets. For example, the targets may be used for fusion applications, plasma generation, or generating other types of energy or particles. The metallic portion of the targets may be formed from various metals. Some embodiments of the targets use a single metal. Other embodiments use multiple metals. When multiple metals are used, the thickness, pattern, and relative order of the metals may be varied as desired. Suitable metals include Au, Al, Pt, Fe, Ge, Cr, V, Cu, Pd, Ta, Ag, Ti, and W.

In one aspect, the present disclosure provides a silicon mold that, when coated with one or more metals, produces a target that is conically shaped with a long neck profile. The present disclosure also provides targets made from such molds, including free-standing metal targets. In one implementation, the mold produces a free-standing silicon nitride target.

One method for making the disclosed funnel cone molds and targets involves depositing silicon dioxide and silicon nitride layers on the front and back sides of a substrate, such as a silicon wafer. A layer of photoresist is applied to the front side and patterned to form windows around an island of silicon nitride/silicon dioxide. The silicon nitride and silicon dioxide beneath the windows is etched away. A large window is patterned and etched in a similar manner on the back side of the substrate. The substrate beneath the front windows is removed using an isotropic etch to produce a capped cone structure. The cap is removed and the front side of the substrate is coated with one or more metals. The substrate beneath the back side window is then removed.

In further aspects, the long neck cone molds or targets described above have extended long neck profiles. According to one method of manufacturing such molds and targets, silicon dioxide layer is formed on the front and back sides of a substrate, such as a silicon wafer. Photoresist layers are deposited on the front and back sides. Windows surrounding a central island of silicon dioxide are opened on the front side. A larger window is opened on the back side. The silicon dioxide beneath the front and back side windows is etched away. A cone structure is formed under the central island on the front side by isotropically etching the substrate beneath the windows. The overhanging region of silicon dioxide above the central island over the cone is then etched away. The front side is then anisotropically etched to extend the length of the neck of the cone structure. One more or metals are deposited on the front side of the substrate. The substrate under the back side window is removed.

In another aspect, the present disclosure provides a silicon mold that, when coated with one or more metals, produces a target that has a Gaussian-like cross section. The present disclosure also provides targets made from such molds. In particular examples, the target has multiple metal layers.

According to one disclosed method of making Gaussian-shaped molds and targets, silicon nitride and silicon dioxide layers are formed on front and back sides of a substrate, such as a silicon wafer. Photoresist layers are deposited on the front and back side, patterned, developed, and etched to form a large window in the back side silicon nitride/silicon dioxide layers and windows defining a central island of silicon nitride/silicon dioxide on the front side of the substrate. The substrate beneath the front side windows is then etched. In a particular example, the etch is an anisotropic etch and produces cavities, and a central pillar, having generally linear sides. The pillar is then rounded using a suitable etch, such as an HNA etch. The etch is continued until the pillar has the desired shape. In another example, the etch is a more isotropic etch and produces cavities and a central pillar having curved sides. The pillar is then rounded using a suitable etch, such as an HNA etch. Regardless of the etch selected, once the rounded pillar has been formed, one or more metal layers are deposited on the front side of the substrate. The substrate above the backside window is then removed.

Further aspects of the present disclosure provide support structures, such as a cantilever, having a mold or target located at an end. In a more specific example, the target is made of a metal. In another example, the target has multiple metal layers. In another implementation, the mold or target is supported by a single support structure. In another implementation, the mold or target is supported by multiple support structures, such as two, three, or four cantilevers. The support structures may be made from an insulating material, for example, silicon nitride. In some implementations, the target or mold is attached to a handling die by a support structure, such as a cantilever, having a cross-section of less than about 15 $\mu m^2$, such as less than about 10 $\mu m^2$ or less than about 2 $\mu m^2$. In a particular example, the cross-section is about 1 $\mu m^2$.

In a further aspect, the present disclosure provides cup-shaped molds and targets, including cup-shaped targets coupled to one or more support structures. The cup-shaped target is formed from a metal layer in some examples. In other examples, the cup-shaped target has multiple metal layers.

According to one disclosed method of forming a cup-shaped target, silicon dioxide and silicon nitride layers are deposited on the front and back sides of a substrate, such as a silicon wafer. Photoresist layers are deposited on the front and back sides, patterned, developed, and etched to form windows defining a large central island in the back side silicon nitride/silicon dioxide layers and windows defining a smaller central island of silicon nitride/silicon dioxide in the front side of the substrate. The photoresist layers are removed and a new photoresist layer is deposited on the front side of the substrate and patterned to form a window over at least a portion of the central island. The exposed silicon nitride, silicon dioxide, and substrate under the central island is then etched to form a central cavity. In some embodiments, this etch also defines a support structure, such as a cantilever, connecting the cavity to the substrate. One or more metal layers are then deposited over the front side of the substrate. The metal above the central cavity is covered with photoresist and the remaining, uncovered metal is removed. The substrate over the back side windows is then removed.

In another aspect, the present disclosure provides targets having embedded metal slugs, including such targets located at the end of a support structure, such as a cantilever. In a specific example, the slug is of a single metal, such as a single slug or multiple slugs of a single metal. In other examples, the slug is a single slug having multiple metal layers or multiple metal slugs, at least one of which has multiple metal layers. In various examples, the slugs have cross-sections that are circular, square, or hexagonal.

One disclosed method of forming a target having embedded metal slugs involves depositing silicon nitride layers on the front and back sides of a substrate, such as a silicon wafer. Photoresist layers are deposited on the front and back sides, patterned, developed, and etched to form windows defining a large central opening in the back side silicon nitride/silicon dioxide layers and windows defining a central island of silicon nitride/silicon dioxide in the front side of the substrate, located over the back side opening. The substrate over the back side opening is then removed. One or more metal layers are deposited on the front side of the substrate. A photoresist layer is deposited on the front side of the substrate and patterned to produce a desired feature, such as a single aperture or multiple apertures. One or more metals are then deposited in the aperture or apertures. This process may be repeated, if desired. In some examples, a protective layer is deposited on the front side of the substrate prior to removing substrate from the back side. A layer of photoresist is deposited on the back side of the substrate, patterned, and developed to open a large window, the silicon nitride layer under the large window etched, and the substrate over the window removed. When a protective layer has been used, it can then be removed.

Another embodiment of the present disclosure provides metal foils having metal dots formed thereon. According to one disclosed method, these targets are formed by depositing silicon dioxide and silicon nitride layers on the front and back sides of a substrate, such as a silicon wafer. Photoresist layers are deposited on the front and back sides, patterned, developed, and etched to form a large back side window in the silicon nitride and silicon dioxide layers and two silicon dioxide/silicon nitride islands defined by windows in the front side of the substrate. One or more metal layers are deposited on the front side of the substrate. Unwanted portions of the metal layer are removed and a layer of photoresist is deposited on the front side of the substrate and patterned as desired, such as to produce desired dot shapes in a desired pattern. One or metal layers are deposited on the front side of the substrate and then unwanted metal portions are removed. Substrate over the back side window is then removed and, optionally, at least a portion of the silicon dioxide layer on the front side of the substrate.

In yet another example, the mold is suitable to produce a stack of metals located at the end of a support structure, such as a cantilever. The metal stack may have varying thicknesses or shapes. In another example, the present disclosure provides a metal foil, which may have multiple layers of different metals, spanned over a silicon die.

One embodiment of a method for forming a stacked metal target involves depositing silicon nitride on the front and back sides of a substrate, such as a silicon wafer. A photoresist layer is deposited on the front side of the substrate, patterned, and developed to form a window in the photoresist into which metals can be deposited. One or more metal layers are then deposited onto the front side of the substrate. Once the desired metal layers have been deposited, in some embodiments, a protective layer is formed on the front side of the substrate. A layer of photoresist is deposited on the back side of the substrate, patterned, developed, and etched to create a cavity under the front side metal layers and, optionally, define support structures, such as pillars, supporting at least a portion of the sides of the metal layers.

Another aspect of the present disclosure provides a metal foil target that is wedge-shaped. One disclosed method of preparing wedge target involves depositing silicon nitride layers on the front and back sides of a substrate, such as a silicon wafer. A photoresist layer is deposited on the front side of the substrate, patterned, developed, and etched to define a central island of silicon nitride. The photoresist is removed and another photoresist layer is applied to the front side of the substrate, patterned, and developed such that the central island is not covered by photoresist. One or more metal layers are then deposited on the front side of the substrate. The metal over the photoresist is removed. A photoresist layer is deposited on the back side of the substrate, patterned, developed, and etched to form a cavity under the metal layers and, optionally, define a support structure, such as support pillars. The front side is then ground, such as with a die, to produce a desired angle in the metal layers. In some cases, a protective layer is placed over the front side of the substrate. The remaining substrate in the back side cavity or cavities is then removed. When a protective layer was used, it is then removed.

In another aspect, the present disclosure provides a mold that can be used to produce a target having a Gaussian-curved profile in the shape of a Winston collector. The present disclosure also provides metal targets having a Gaussian-curved profile in the shape of a Winston collector. In particular examples, the Winston collector has an apex and a hemisphere is located at the apex. In another example, the Winston collector has an apex and an aperture is formed in the apex.

According to one method of forming a Winston collector having a hemisphere at its apex, a photoresist layer is deposited on the back side of a substrate, such as a silicon wafer. The photoresist layer is patterned, developed, and isotropically etched to form a hemispherical cavity in the back side of the substrate. A silicon nitride layer is deposited on the substrate and removed from the front side of the wafer, leaving the film on the back side only. Silicon dioxide layers are then deposited to the front side of the substrate. A photoresist layer is deposited on the front side of the substrate, patterned, developed, and etched to form a central window in the silicon dioxide layer. A cavity, such as a cavity having a Gaussian-like profile, is formed under the window, for example, using an isotropic etch. The silicon dioxide layer on the front side of the substrate is removed and one or more metal layers are deposited on the front side of the substrate. The silicon dioxide layer on the back side of the substrate, and at least a portion of the substrate underlying the metal layer, are then removed.

One disclosed method of forming a Winston collector having a hole at its apex involves coating the front and back sides of a substrate, such as a silicon wafer, with silicon nitride. A photoresist layer is deposited on the front side of the substrate, patterned, developed, and etched to form a central window in the silicon nitride layer. The substrate underneath the window is removed, such as using an isotropic etch, to produce a cavity. A photoresist layer is deposited on the back side of the substrate, patterned, developed, and etched to form an aperture underneath the apex of the front side cavity. One or more metal layers are then deposited on the front side of the substrate. The metal above the back side aperture is removed. The silicon nitride layer on the back side of the substrate is removed, followed by at least a portion of the substrate on the back side.

The present disclosure also provides an apparatus for mounting targets. In a particular example, the apparatus includes a silicon structure having one or more apertures. One or more targets, such as targets attached to a handling die, can be located in each of the apertures. The depth, position, and orientation of the apertures can be used to control the relative alignment of the target or targets.

In one embodiment, a target mounting apparatus is formed by coating the front and back sides of a substrate, such as a silicon wafer, with silicon nitride. A photoresist layer is deposited on the front side of the substrate, patterned, developed, and etched to form one or more cavities in the silicon nitride and substrate into which targets can be mounted. The masking and etching process may be repeated, such as when cavities of different depths are desired.

In another aspect, the present disclosure provides a target manipulation apparatus. The target manipulation apparatus, in a particular implementation, includes a mount for holding a wafer. The mount is rotatable. The mount is coupled to a xyz stage that translates the mount in space. In a more particular example, the mount and stage are manually controllable. In another example, the mount and stage are coupled to a computer and are controlled via software. The software, in some examples, allows for manual control of the mount and stage. In other examples, the software allows for automated control of the mount and stage.

The present disclosure also provides a method for manipulating a target. The method includes providing a wafer, the wafer comprising a plurality of targets. A first target of the plurality of targets on the wafer is placed at a desired location, such as in the path of a laser. A second target of the plurality of targets on the wafer is then placed at a desired location, such as in the path of a laser. In a particular example, the first target is irradiated with the laser prior to the second target being placed at the desired location. In further implementations, the wafer includes a first target type and a second target type. The method includes selecting a target of a first type as the first target. In a more particular example, the method then includes selecting a target of the second type as the second target.

In another aspect, the present disclosure provides targets having a conductive lead or a piezoresistive material. In a particular implementation, the target includes both a conductive lead and a piezoresistive material. In one example, the target is coupled to a support structure, such as a cantilever, which is in turn coupled to a substrate. The support structure includes the conductive lead and the piezoresistive material. In another example, the piezoresistive material is located proximate the target, such as above or below the target.

The present disclosure also provides a method of forming a target having a conductive lead or a piezoresistive material. In one example, the method forms a target having both a conductive lead and a piezoresistive material. In a particular implementation, the method includes forming a support structure coupling a target to a substrate. In one example, a conductive material is deposited on the support structure. In another example, a piezoresistive material is deposited on the support structure. In yet another example, a piezoresistive material and a conducting material are deposited on the support structure. In other examples, the conducting material is formed by doping silicon, such as silicon above or below the target, in the support structure, or in the substrate. In a further example, the piezoresistive material is formed by doping silicon, such as silicon above or below the target or in a support structure.

In another embodiment, the present disclosure provides a method of using a target having a conductive lead and a piezoresistive material. In one implementation, the method involves applying a current to the conductive lead to heat the piezoresistive material. The target is then irradiated. In a particular example, the piezoresistive material is heated such that the support structure melts, such as immediately prior to the target being irradiated. This method can, for example, result in a target suspended in free space at the moment it is irradiated.

In another implementation, a piezoresistive material proximate the target is used to place a charge proximate the target, such as just before the target is irradiated. In yet another implementation, the piezoresistive material, or the conductive material, is used to influence the products of target irradiation, such as to at least partially contain generated electrons, which can enhance proton acceleration.

There are additional features and advantages of the subject matter described herein. They will become apparent as this specification proceeds.

In this regard, it is to be understood that this is a brief summary of varying aspects of the subject matter described herein. The various features described in this section and below for various embodiments may be used in combination or separately. Any particular embodiment need not provide all features noted above, nor solve all problems or address all issues in the prior art noted above.

BRIEF DESCRIPTION OF THE DRAWINGS

Various embodiments are shown and described in connection with the following drawings in which:

FIGS. 6A-6H are cross sectional diagrams illustrating a process for forming funnel cone molds and targets having an extended neck section according to an embodiment of the present disclosure.

FIG. 7 is an illustration of a top plan view of a funnel cone target having an extended neck according to an embodiment of the present disclosure.

FIG. 8 is a scanning electron microscope image of a funnel cone target having an extended neck according to an embodiment of the present disclosure.

FIG. 9 is a scanning electron microscope image of a funnel cone target having an extended neck according to an embodiment of the present disclosure.

FIGS. 14A-14I are cross sectional diagrams illustrating a process for forming molds and targets having a cup located at the end of a cantilever.

FIGS. 25A-25L are cross sectional diagrams illustrating a process for forming molds and targets having embedded metal slugs located at the end of a cantilever.

FIGS. 37A-37M are cross sectional diagrams illustrating a process for forming stacked metal foil targets.

FIG. 38 is an illustration of a top plan view of a metal foil target having multiple metal layers according to an embodiment of the present disclosure.

FIGS. 42A-42I are cross sectional diagrams illustrating a process for forming a target or mold formed in the shape of a Winston collector and having a hemisphere at the apex.

FIG. 43 is an illustration of a top plan view of a target or mold formed in the shape of a Winston collector and having a hemisphere at the apex according to an embodiment of the present disclosure.

FIGS. 48A-48J are schematic representations of target mounting apparatus according to an embodiment of the present disclosure.

DETAILED DESCRIPTION

Unless otherwise explained, all technical and scientific terms used herein have the same meaning as commonly understood by one of ordinary skill in the art to which this disclosure belongs. In case of conflict, the present specification, including explanations of terms, will control. The singular terms "a," "an," and "the" include plural referents unless context clearly indicates otherwise. Similarly, the word "or" is intended to include "and" unless the context clearly indicates otherwise. The term "comprising" means "including;" hence, "comprising A or B" means including A or B, as well as A and B together. Although methods and materials similar or equivalent to those described herein can be used in the practice or testing of the present disclosure, suitable methods and materials are described herein. The disclosed materials, methods, and examples are illustrative only and not intended to be limiting. Additional information useful for practicing the subject matter of the present disclosure can be found in U.S. patent application Ser. No. 12/066,479, incorporated by reference herein to the extent not inconsistent with the present disclosure.

Funnel Cone

Referring generally to FIGS. 1A through 1G, cross sectional diagrams show the progressive processing for forming funnel cone targets according to variations of a first aspect of the present disclosure.

Figure 1A:
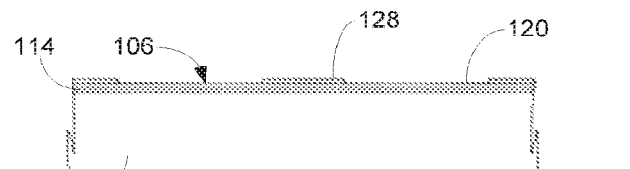
FIGS. 1A through 1G are cross sectional diagrams illustrating a process for forming funnel cone molds and targets according to an embodiment of the present disclosure.

Referring first to FIG. 1A, a silicon substrate 100, such as p-type silicon having a <100> crystal orientation, is provided as a substrate. In a particular example, the silicon is double polished. Thermal silicon dioxide layers 114, 116, such as about 4 µm layers, are deposited on both sides 106, 108 of the substrate 100. Silicon nitride layers 120, 122 such as 2 µm layers, are deposited on the thermal silicon dioxide layers 114, 116. The silicon nitride layers 120, 122, in some examples, are deposited in a manner such that the layers 120, 122 have comparatively low stress, such as using low pressure chemical vapor deposition. Standard photolithography exposure and developing techniques are used to define a temporary mask 128 on the silicon nitride layer 120.

In one example, about 1.6 µm of photoresist, such as Shipley 3612, is deposited on the silicon nitride layer 120. In a particular example, the substrate 100 is primed with Hexamethyldisilazane (HMDS) before applying the photoresist. The substrate 100 is then soft baked at 90° C. The mask layer is then patterned using conventional photolithography techniques, such as by exposing the substrate 100 to the desired mask pattern for a suitable period of time, such as about 1.7 seconds. In some examples, the substrate 100 is developed using LDD26W (available from Shipley Co.) developer and a 110° C. postbake.

Figure 1B:
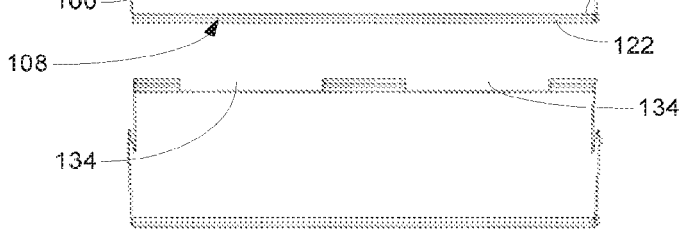

As shown in FIG. 1B, the silicon nitride layer 120 is etched using standard semiconductor processing techniques, such as using a RIE (reactive ion etch) dry etch for 4 minutes, to clear windows 134. In a particular example, the etch rate is about 300 Å/m. In a particular example, the RIE employs a mixture of $SF_6$ and $O_2$. In some cases, visual inspection can be used to verify that the dry etch has etched through the entire silicon nitride layer 120.

A wet etch, such as 6:1 BOE, can be used to etch through the silicon dioxide layer 114 on the windows 134. Remaining photoresist can be stripped by a suitable process, such as a standard $O_2$ etch. FIG. 1B shows the structure resulting after these processing steps have been performed.

Figure 1C:
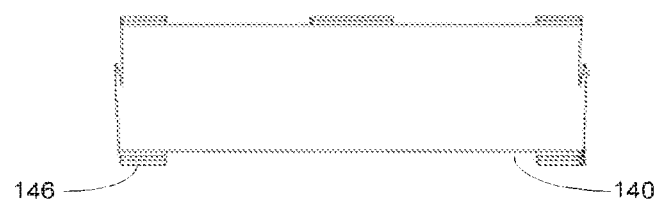

Using analogous masking and etch techniques to those described above, a larger window 140 is opened on the back side of the substrate 100. FIG. 1C shows the structure resulting from these steps, including a mask layer 146 on the back side of the substrate 100. The mask layer 146 may be removed as described above.

Figure 1D:
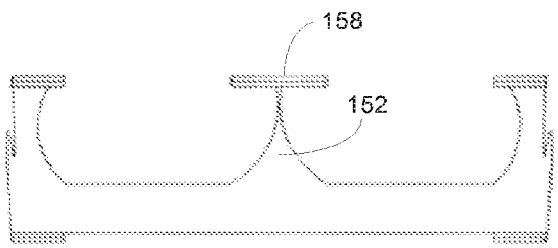

A standard pre-diffusion cleaning process is typically used prior to further processing of the substrate 100. A deep isotropic etch is used to produce a central cone 152 capped with top 158 of silicon dioxide and silicon nitride from layers 114, 120. The etch is typically stopped before the top 158 falls off the cone 152. In a specific example, the deep isotropic etch is performed using an STS Deep Reactive Ion Silicon Etcher (STS plc, Newport, UK), eliminating the standard sidewall passivation step typically used in the Bosch process. The resulting structure is shown in FIG. 1D.

Figure 1E:
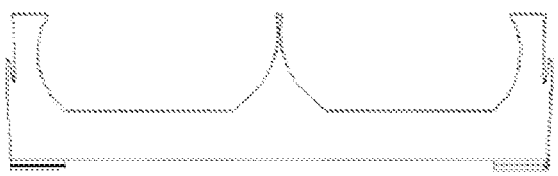

The top 158 is removed to produce the structure shown in FIG. 1E. In one implementation, the top 158 is removed by soaking the substrate in 6:1 BOE to etch the top 158.

Figure 1F:
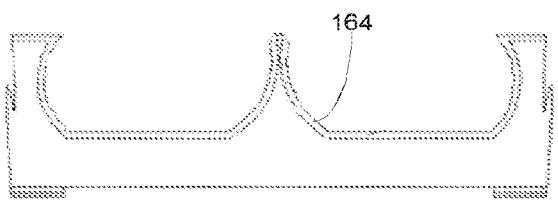
Figure 1G:
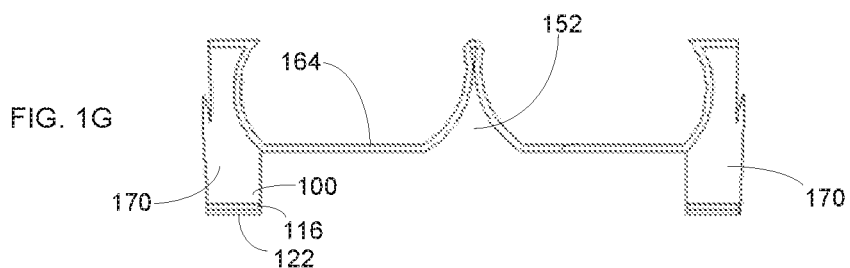

A desired metal is then deposited on the front side of the substrate 100 to form a metal layer 164. In a specific example, the metal layer is about 10 µm of gold deposited by sputtering. The coated structure is shown in FIG. 1F.

Finally, the back side of the substrate 100 is removed using a standard KOH etch. The KOH removes the silicon from the substrate 100, leaving only the metal layer 164 and support structures 170 where the back side of the substrate 100 was still coated with silicon dioxide layer 116 and silicon nitride layer 122.

In some example, the targets created using the above-describe process have metal layer thickness of less than about 20 µm, such as less than about 15 µm, less than about 10 µm, or less than about 5 µm. In a specific example, the metal layer has a thickness of about 10 µm. The height of the targets is, in some examples, between about 50 µm and about 500 µm, such as between about 100 µm and about 250 µm or between about 150 µm and about 300 µm. The width of the neck of the targets is, in some examples, between about 1 µm and about 100 µm, such as between about 5 µm and about 75 µm or between about 5 µm and about 50 µm.

Figure 2:
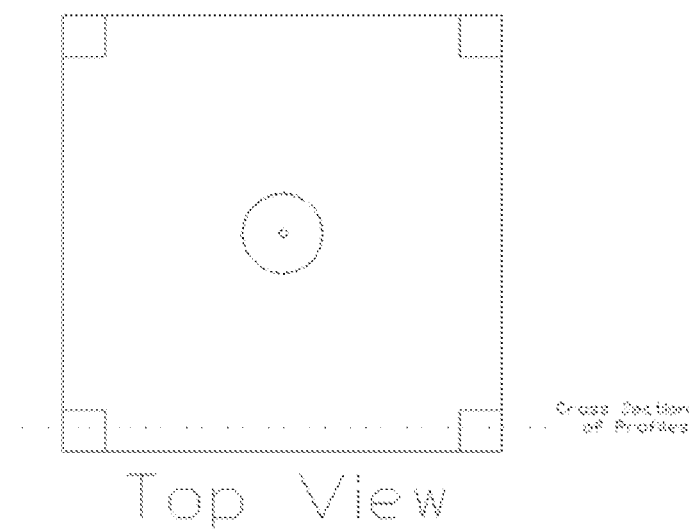
FIG. 2 is an illustration of a top plan view of a funnel cone target according to an embodiment of the present disclosure.
Figure 3:
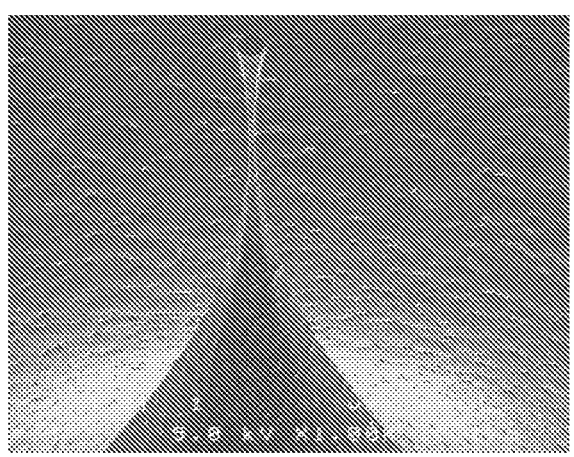
FIG. 3 is a scanning electron microscope image of a funnel cone target according to an embodiment of the present disclosure.
Figure 4:
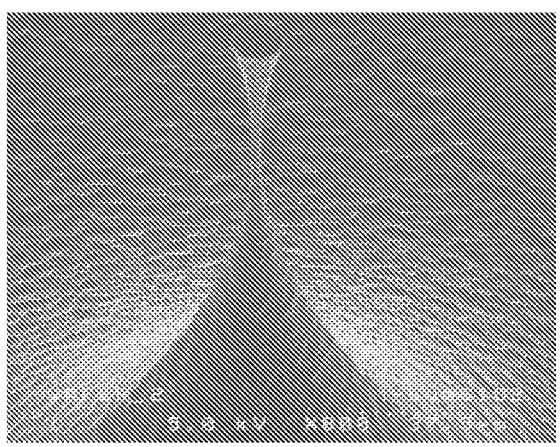
FIG. 4 is a scanning electron microscope image of a funnel cone target according to an embodiment of the present disclosure.

A cross section of the foil target produced using the above-described process is shown in FIG. 2. SEM images of targets formed from this process are shown in FIGS. 3 and 4.

Figure 5:
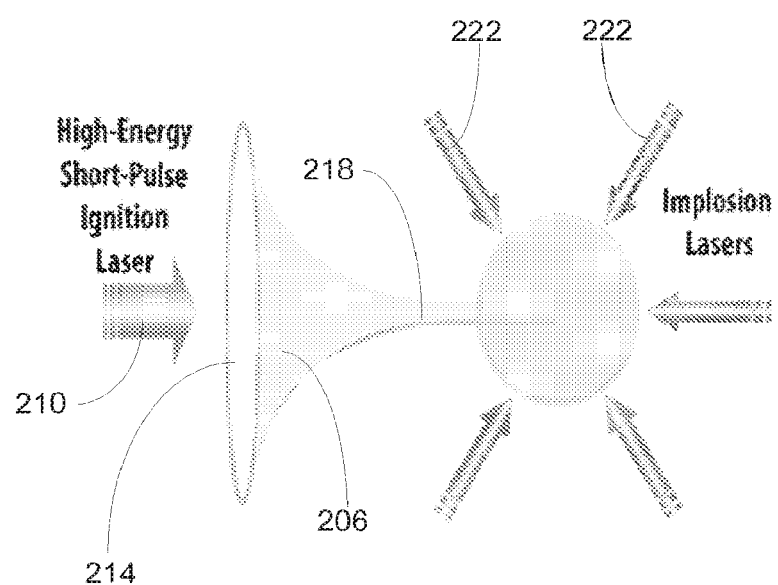
FIG. 5 is a schematic diagram illustrating how a funnel cone target according to an embodiment of the present disclosure may be used.

FIG. 5 presents a schematic illustration of a method of using a funnel cone target 206. An ignition laser, such as a high-energy short-pulse ignition laser 210, is directed through the wide base 214 of the target 206. Radiation from the ignition laser 210 is focused towards the neck 218 of the target 206. Implosion lasers 222 are focused at fuel located proximate the tip of the target 206.

The funnel cone targets may be useful, as the long neck design can create magnetic fields at the neck base when irradiated, trapping energy at the tip of the target. This effect may give rise to hotter targets compared with other target shapes. Adjusting the length of the neck can influence where the trapped energy is focused. These hot targets can be used, for example, in fast ignition laser fusion, such as to ignite a fuel source.

Extended Neck Funnel Cone

Referring generally to FIGS. 6A through 6H, cross sectional diagrams show the progressive processing for forming extended neck funnel cone targets according to variations of an embodiment of the present disclosure.

Figure 6A:
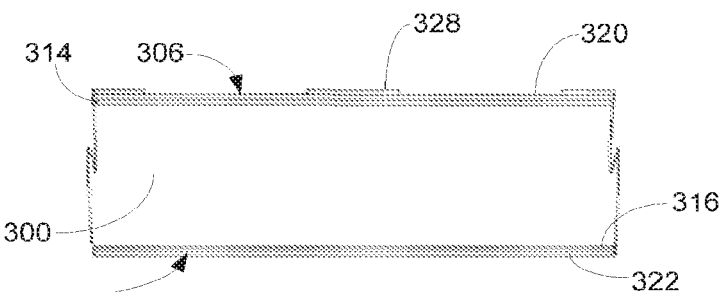

Referring first to FIG. 6A, a silicon substrate 300, such as p-type silicon having a <100> crystal orientation, is provided as a substrate. In a particular example, the silicon is double polished. Thermal silicon dioxide layers 314, 316, such as about 4 µm layers, are deposited on both sides 306, 308 of the substrate 300. Silicon nitride layers 320, 322 such as 2 µm layers, are deposited on the thermal silicon dioxide layers 314, 316. The silicon nitride layers 320, 322, in some examples, are deposited in a manner such that the layers 320, 322 have comparatively low stress, such as using low pressure chemical vapor deposition. Standard photolithography exposure and developing techniques are used to define a temporary mask 328 on the silicon nitride layer 320.

In one example, about 1.6 µm of photoresist, such as Shipley 3612, is deposited on the silicon nitride layer 320. In a particular example, the substrate 300 is primed with Hexamethyldisilazane (HMDS) before applying the photoresist. The substrate 300 is then soft baked at 90° C. The mask layer is then patterned using conventional photolithography techniques, such as by exposing the substrate 300 to the desired mask pattern for a suitable period of time, such as about 1.7 seconds. In some examples, the substrate 300 is developed using LDD26W (available from Shipley Co.) developer and a 110° C. postbake.

Figure 6B:

As shown in FIG. 6B, the silicon nitride layer 320 is etched using standard semiconductor processing techniques, such as using a RIE (reactive ion etch) dry etch for 4 minutes, to clear windows 334. In a particular example, the etch rate is about 300 Å/m. In a particular example, the RIE employs a mixture of $SF_6$ and $O_2$. In some cases, visual inspection can be used to verify that the dry etch has etched through the entire silicon nitride layer 320.

A wet etch, such as 6:1 BOE, can be used to etch through the silicon dioxide layer 314 on the windows 334. Remaining photoresist can be stripped by a suitable process, such as a standard $O_2$ etch. FIG. 6B shows the structure resulting after these processing steps have been performed.

Figure 6C:
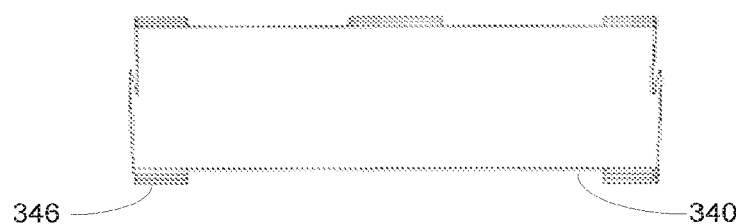

Using analogous masking and etch techniques to those described above, a larger window 340 is opened on the back side of the substrate 300. FIG. 6C shows the structure resulting from these steps, including a mask layer 346 on the back side of the substrate 300. The mask layer 346 may be removed as described above.

Figure 6D:
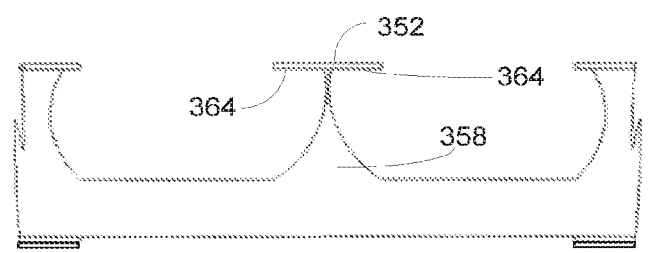

A standard pre-diffusion cleaning process is then typically performed on the substrate 300. With reference to FIG. 6D, the substrate underlying the windows 334 is removed, such as using a dry etch. In a particular example, the dry etch is performed using an STS Deep Reactive Ion Silicon Etcher. However, the sidewall passivation step of the standard Bosch process is typically eliminated. The etch is discontinued before the silicon nitride/silicon dioxide "top" 352 falls off the cone 358 formed by the etching process.

Figure 6E:
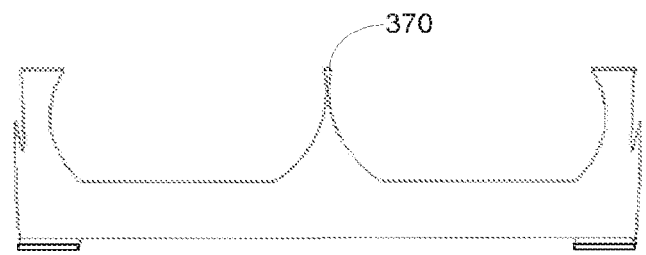

The portions 364 extending outwardly from the tip 370 of the cone 358 can be removed to produce the structure shown in FIG. 6E. This may be accomplished, for example, by soaking the substrate 300 in a suitable etchant, such as 6:1 BOE. Because the front and back sides of the portions 364 are exposed to the etchant, they will etch twice as fast as the portion of the top 352 over the tip 370 of the cone 358.

Figure 6F:
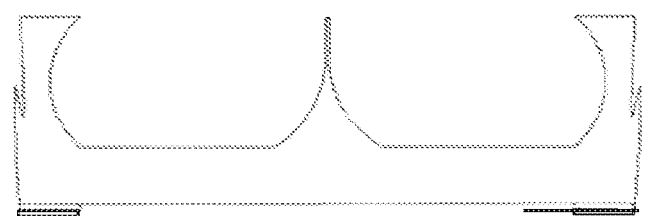

The neck of the cone 358 can be extended to produce the structure shown in FIG. 6F. In one example, the remaining silicon dioxide top 352 over the cone tip 370 is used to protect the cone 358 while an etch, such as a dry anisotropic etch using an STS DRIE plasma etcher, is performed. The etch is continued until the neck of the cone 358 has the desired shape.

With reference to FIG. 6G, a metal layer 376 may be deposited on the front side 306 of the substrate 300. In one example, the metal layer 376 is sputter coated onto the substrate 300. The metal layer 376 is, in a specific example, a 10 µm layer of gold.

The substrate 300 over the window 340 may be removed using a suitable etch to produce the final target, shown in FIG. 6H. In a specific example, KOH is used as the etchant.

In some example, the targets created using the above-describe process have metal layer thickness of less than about 20 µm, such as less than about 15 µm, less than about 10 µm, or less than about 5 µm. In a specific example, the metal layer has a thickness of about 10 µm. The height of the targets is, in some examples, between about 50 µm and about 500 µm, such as between about 100 µm and about 250 µm or between about 150 µm and about 300 µm. The width of the neck of the targets is, in some examples, between about 1 µm and about 100 µm, such as between about 5 µm and about 75 µm or between about 5 µm and about 50 µm.

FIG. 7 is a top plan view of a target formed by the above described process. FIGS. 8 and 9 are SEM images of extended neck funnel cone targets produced using this process.

Gaussian Curved Targets

Figure 10A:
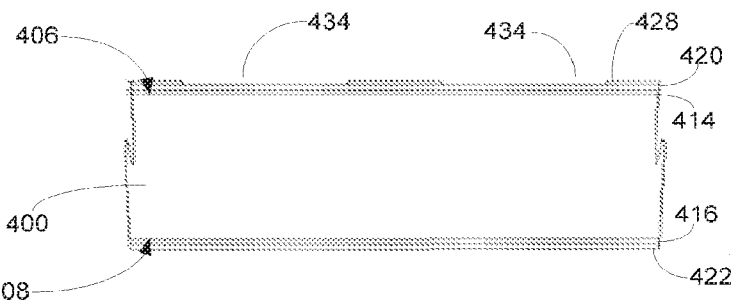
FIGS. 10A-10I are cross sectional diagrams illustrating a process for forming molds and targets having a Gaussian-shaped cross section according to an embodiment of the present disclosure.

Certain embodiments of the present disclosure provide laser targets having cross sections resembling a Gaussian curve. The following discussion provides an example of how such targets may be fabricated. Referring first to FIG. 10A, a silicon substrate 400, such as p-type silicon having a <100> crystal orientation, is provided as a substrate. In a particular example, the silicon is double polished. Thermal silicon dioxide layers 414, 416, such as about 4 µm layers, are deposited on both sides 406, 408 of the substrate 400. Silicon nitride layers 420, 422 such as 2 µm layers, are deposited on the thermal silicon dioxide layers 414, 416. The silicon nitride layers 420, 422, in some examples, are deposited in a manner such that the layers 420, 422 have comparatively low stress, such as using low pressure chemical vapor deposition. Standard photolithography exposure and developing techniques are used to define a temporary mask 428 on the silicon nitride layer 420.

In one example, about 1.6 µm of photoresist, such as Shipley 3612, is deposited on the silicon nitride layer 420. In a particular example, the substrate 400 is primed with Hexamethyldisilazane (HMDS) before applying the photoresist. The substrate 400 is then soft baked at 90° C. The mask layer is then patterned using conventional photolithography techniques, such as by exposing the substrate 400 to the desired mask pattern for a suitable period of time, such as about 1.7 seconds. In some examples, the substrate 400 is developed using LDD26W (available from Shipley Co.) developer and a 210° C. postbake. The masking process produces the structure shown in FIG. 10B, having windows 434 formed in the mask layer 428.

Figure 10B:
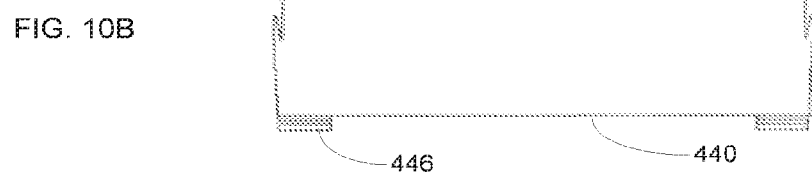

Using analogous masking and etch techniques to those described above, a larger window 440 is opened on the back side of the substrate 400, as shown in FIG. 10B. The mask layer 446 may be removed as described above.

Figure 10C:
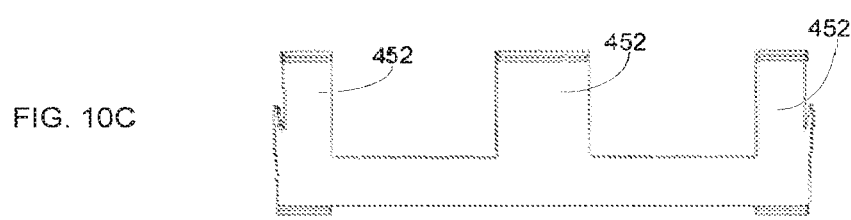

The windows 434 formed through the mask are etched, such as using a deep reactive-ion etch using the Bosch process. An STS plasma etcher may be used for this technique. The etch results in the structure shown in FIG. 10C, having silicon pillars 452.

Figure 10D:
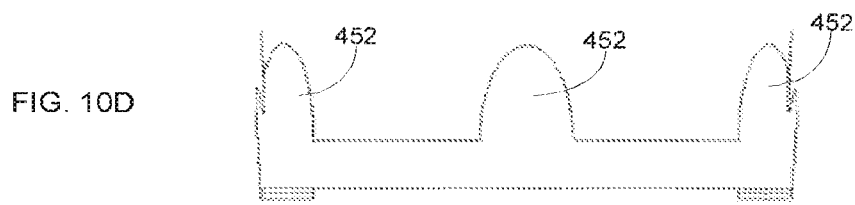
Figure 10E:
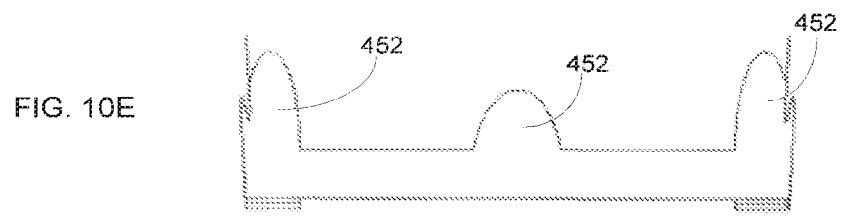

The silicon pillars 452 are rounded using an HNA wet etch. HNA is a mixture of nitric acid, hydrofluoric acid, and acetic acid. Nitric acid oxidizes the silicon, which is then removed by hydrofluoric acid. Acetic acid acts a diluent. Water can also be used as a diluent, but acetic acid has the advantage of reducing dissociation of nitric acid. Varying the time and composition of the etch can be used to produce differently shaped targets. In a specific example, the HNA mixture includes about 30% HF (49.23%), about 30% acetic acid, and about 40% nitric acid (69.51%). The structure resulting from the HNA etch is shown in FIG. 10D. FIG. 10E shows the structure which results when the etch time is increased. The height of the central pillar 448 has been reduced, in addition to being rounded.

Figure 10F:
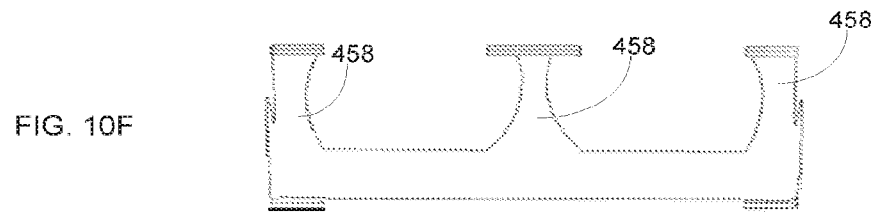

In a modified version of the above-procedure, after achieving the structure shown in FIG. 10B, a deep reactive-ion etch, such as using an STS DRIE plasma etcher, is used to produce the structure shown in FIG. 10F, having silicon pillars 458. This structure can be achieved by limiting the time the sidewalls of the etch trench are passivated during the Bosch process. This provides a more isotropic etch profile. A wet etch, such as 6:1 BOE, is used to remove the silicon dioxide layer 414.

Figure 10G:
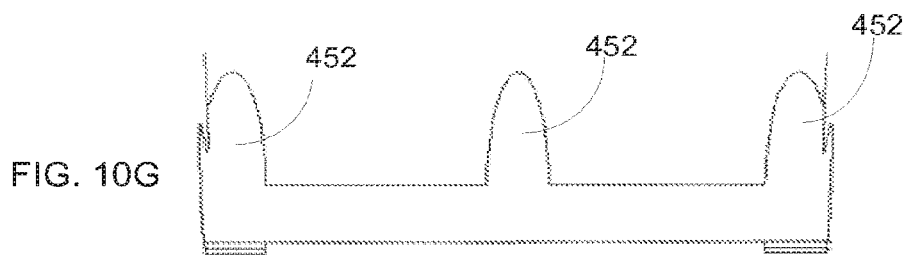
Figure 10H:
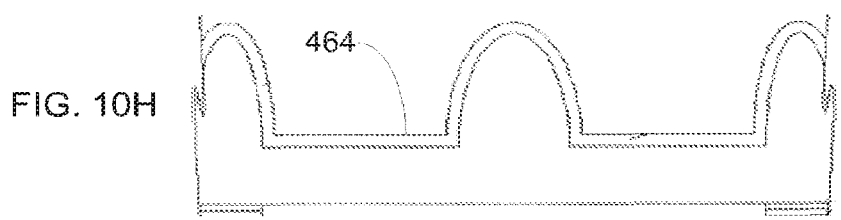
Figure 10I:
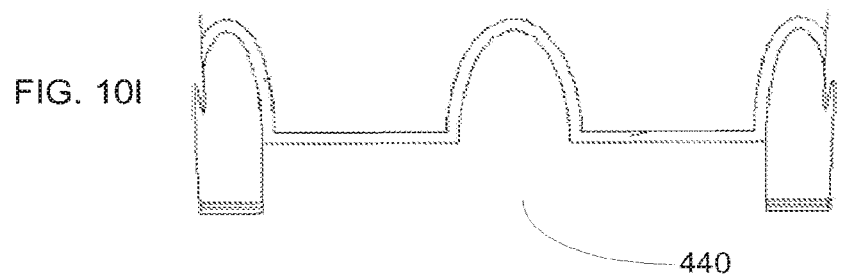

A HNA etch, as described above, is used to round the silicon pillars 458 and produce the structure shown in FIG. 10G. The HNA etch time can greatly affect the curve of the pillars 458. Thus, in one example, short wet etch intervals are used. The shape of the pillars 458 can be observed between etches to gauge the progress of the etch so it can be stopped when the desired shape has been achieved.

The front of the silicon mold of FIG. 10D, 10E, or 10G is then coated with a metal layer 464, such as 10 µm of sputtered gold. The remaining silicon substrate above the window 440 can then be removed using a suitable etch, such as a KOH wet etch, leaving a hollow target having a cross section in the shape of a Gaussian curve.

In some example, the targets created using the above-describe process have metal layer thickness of less than about 20 µm, such as less than about 15 µm, less than about 10 µm, or less than about 5 µm. In a specific example, the metal layer has a thickness of about 10 µm. The height of the targets is, in some examples, between about 50 µm and about 500 µm, such as between about 100 µm and about 250 µm or between about 150 µm and about 300 µm. In other examples, the target height is less than about 200 µm, such as less than 150 µm, less than about 100 µm, or less than about 50 µm.

Figure 11:
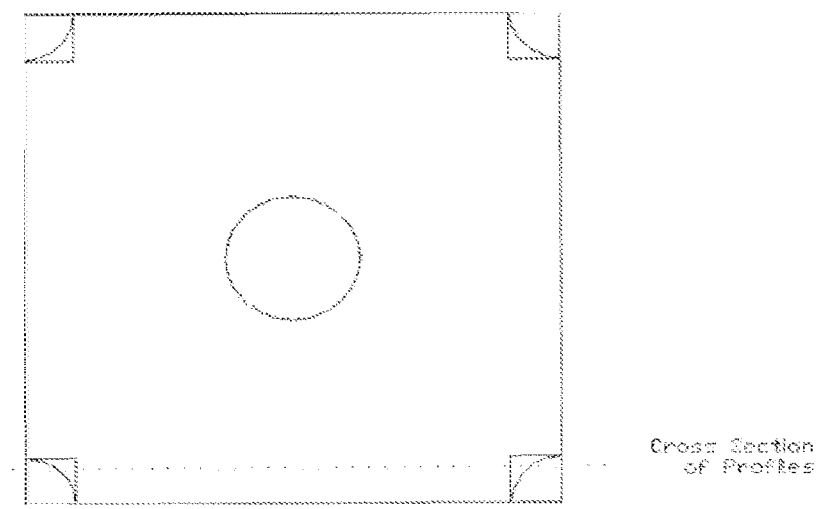
FIG. 11 is an illustration of a top plan view of a target having a Gaussian-shaped cross section according to an embodiment of the present disclosure.
Figure 12:
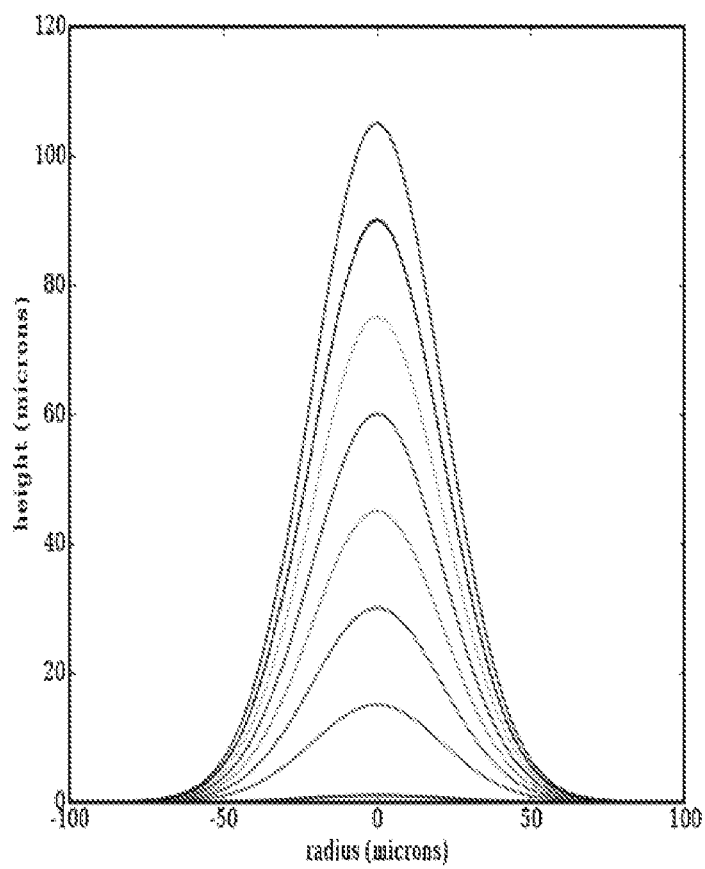
FIG. 12 is a graph of height versus radius for targets having Gaussian-shaped profiles that may be formed using the method of the present disclosure.
Figure 13:
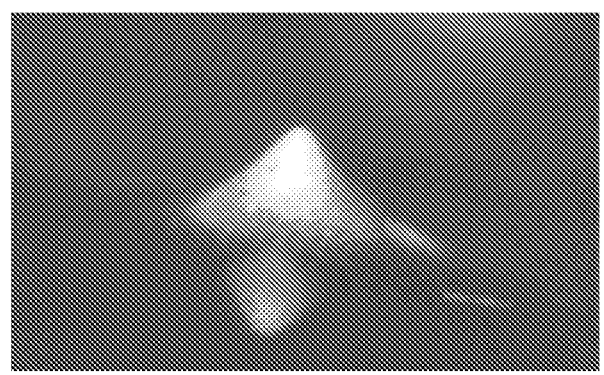
FIG. 13 is an optical microscope image of a target having a Gaussian-shaped cross section according to an embodiment of the present disclosure.

A cross sectional view of the target created using the above-described process is shown in FIG. 11. FIG. 12 is a graph of height (microns) versus radius (microns) for various Gaussian targets according the present embodiment. FIG. 13 is an optical microscope image of a target formed using the disclosed technique.

Support Arm Target With End Cup

In some embodiments, it may be useful to have a target attached to a comparatively small amount of surrounding material. Doing so can, for example, reduce electronic coupling between the target and the surrounding environment, which can produce cleaner target ignition and more radiation. Thus, the present disclosure provides targets attached to a support arm, the support arm being coupled to a larger substrate. Although the following example describes a cup-shaped target, other target shapes can be formed at the end of the support arm. In addition, the cup target can be created without a support arm.

Referring first to FIG. 14A, a silicon substrate 500, such as p-type silicon having a <100> crystal orientation, is provided as a substrate. In a particular example, the silicon is double polished. Thermal silicon dioxide layers 514, 516, such as about 4 µm layers, are deposited on both sides 506, 508 of the substrate 500. Silicon nitride layers 520, 522 such as 2 µm layers, are deposited on the thermal silicon dioxide layers 514, 516. The silicon nitride layers 520, 522, in some examples, are deposited in a manner such that the layers 520, 522 have comparatively low stress, such as using low pressure chemical vapor deposition. Standard photolithography exposure and developing techniques are used to define a temporary mask 528 on the silicon nitride layer 520.

In one example, about 1.6 µm of photoresist, such as Shipley 3612, is deposited on the silicon nitride layer 520. In a particular example, the substrate 500 is primed with Hexamethyldisilazane (HMDS) before applying the photoresist. The substrate 500 is then soft baked at 90° C. The mask layer is then patterned using conventional photolithography techniques, such as by exposing the substrate 500 to the desired mask pattern for a suitable period of time, such as about 1.7 seconds. In some examples, the substrate 500 is developed using LDD26W (available from Shipley Co.) developer and a 210° C. postbake. The masking process produces the structure shown in FIG. 14B, having windows 534 formed in the mask layer 528.

Using analogous masking and etch techniques to those described above, two windows 540 are opened on the back side of the substrate 500, as shown in FIG. 14C. The mask layer 528 may be removed as described above.

As shown in FIG. 14D, a thick resist layer 546 is deposited over the front side of the substrate 500. The resist layer 546 is patterned to open a central window 552. The window 552 leaves open a portion 558 of the silicon dioxide layer and silicon nitride layers intermediate the windows 534. The central window 552 defines the diameter of the cup.

The exposed window 552 is then etched, such as using a dry etch. In a particular example, the window 552 is etched using the DRIE Bosch process. The etch continues until the cup has the desired depth. The resulting structure is shown in FIG. 14E, where the substrate 500 includes a circular void 564 having a ring 570 of silicon dioxide and a ring 576 of silicon nitride around the top.

Typically, the substrate 500 is then cleaned. As shown in FIG. 14F, a desired metal layer 582 is then deposited on the front side of the substrate. In a specific example, the metal layer 582 is about 10 µm of sputtered gold.

Figure 14G:
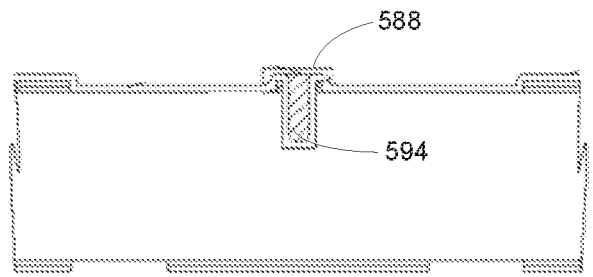

A photoresist layer 588 is then patterned in the form of a circular plug to cover the top and perimeter of the cup 594, as shown in FIG. 14G. In some cases, multiple photoresist applications may be needed to provide adequate photoresist coverage.

Figure 14H:
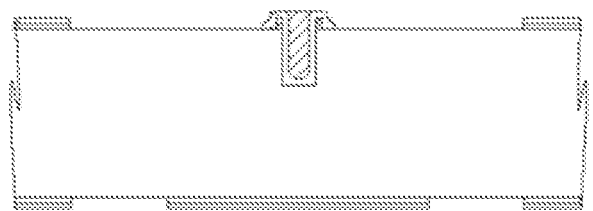
Figure 14I:
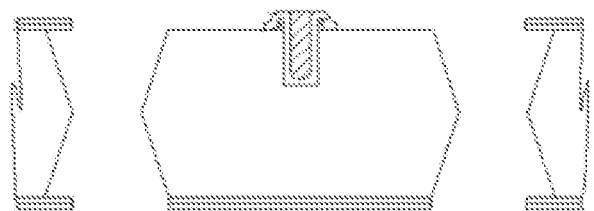
Figure 15:
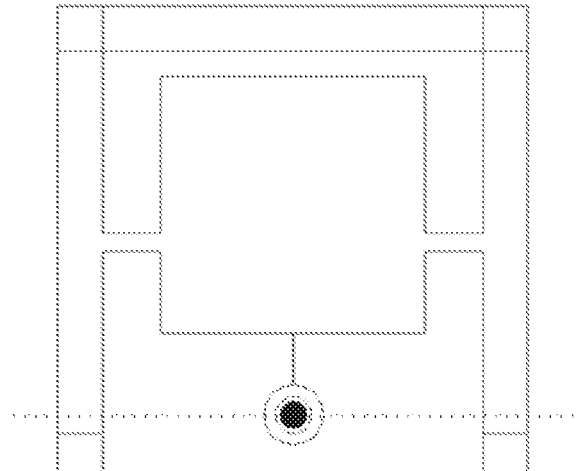
FIG. 15 is an illustration of a top plan view of a target having a cup located at the end of a cantilever according to an embodiment of the present disclosure.

When the photoresist layer 588 has been formed, the uncovered metal layer 582 is etched. In one example, the etchant is AU-5. Typically, the substrate 500 is then cleaned. The resulting structure is shown in FIG. 14H. A top view of the structure is shown in FIG. 15.

In some example, the targets created using the above-describe process have metal layer thickness of less than about 20 µm, such as less than about 15 µm, less than about 10 µm, or less than about 5 µm. In a specific example, the metal layer has a thickness of about 10 µm. The height of the targets is, in some examples, between about 5 µm and about 500 µm, such as between about 10 µm and about 250 µm or between about 10 µm and about 100 µm. In other examples, the target height is less than about 150 µm, such as less than 100 µm, less than about 50 µm, or less than about 15 µm. The diameter of the cup portion of the target is, in some examples, between about 10 µm and about 500 µm, such as between about 50 µm and about 250 µm or between about 75 µm and about 150 µm. In a specific example, the cup diameter is about 100 µm.

Figure 16:
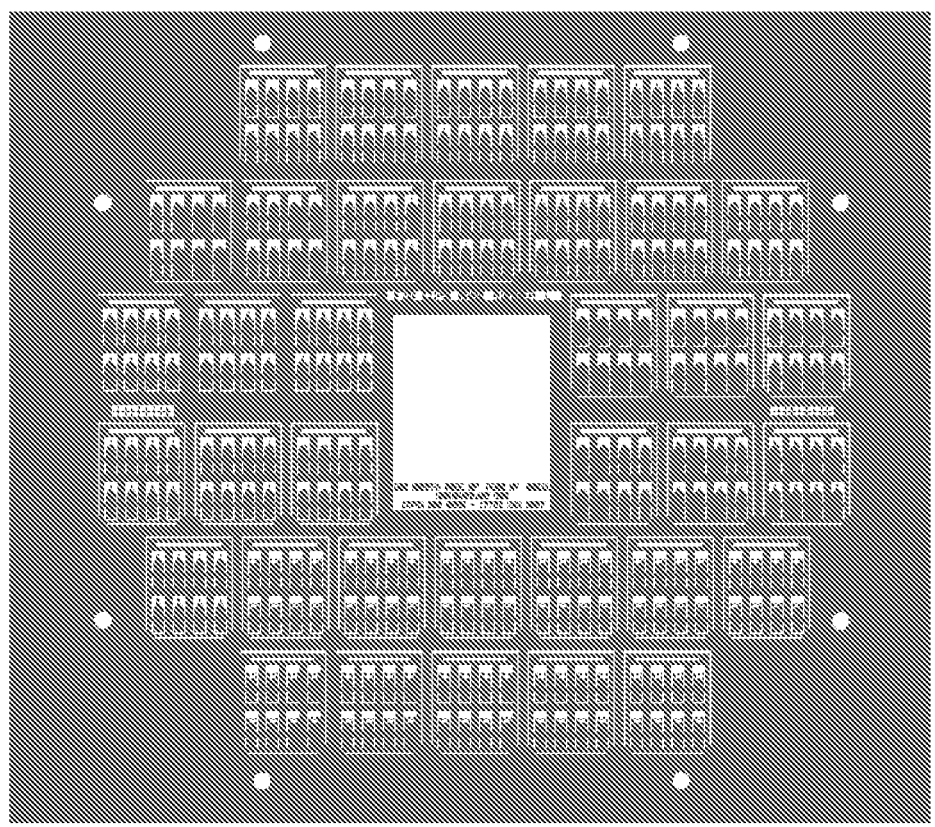
FIG. 16 is an illustrative mask layout for a photomask that may be used in etching the front side of the wafer in the process of FIGS. 14A through 14I.
Figure 17:
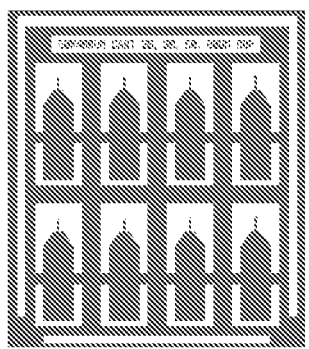
FIG. 17 is an illustrative mask layout for a photomask that may be used in etching the front side of the wafer in the process of FIGS. 14A through 14I.
Figure 18:
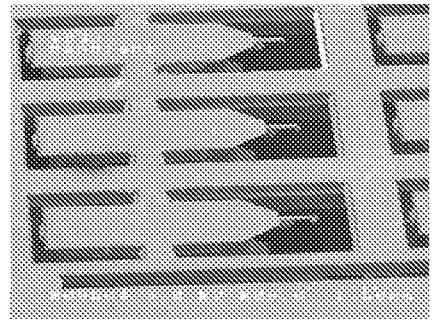
FIG. 18 is a scanning electron microscope image of a target having a cup located at the end of a cantilever produced according to an embodiment of the present disclosure.

FIGS. 16 and 17 are top level masks of the die shape etched into the silicon nitride layer 520. FIGS. 18-22 are SEM images of a cup target coupled to a cantilever formed using the above-described process.

Figure 19:
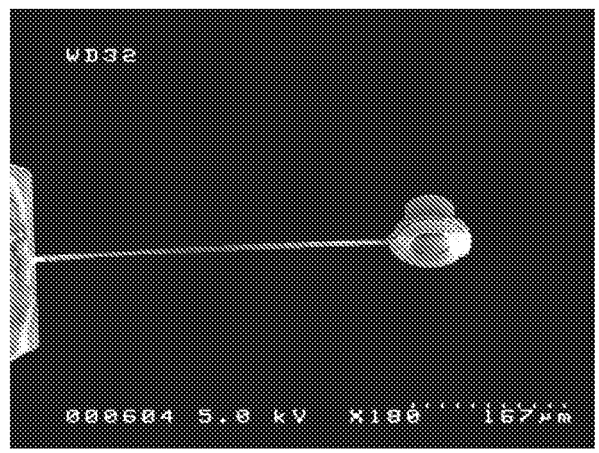
FIG. 19 is a scanning electron microscope image of a target having a cup located at the end of a cantilever produced according to an embodiment of the present disclosure.
Figure 20:
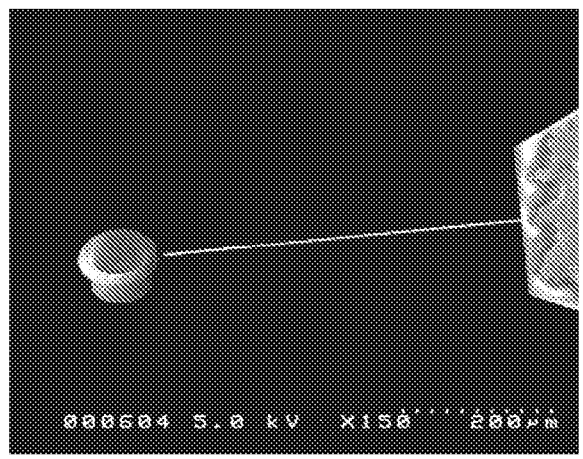
FIG. 20 is a scanning electron microscope image of a target having a cup located at the end of a cantilever produced according to an embodiment of the present disclosure.
Figure 21:
FIG. 21 is a scanning electron microscope image of a target having a cup located at the end of a cantilever produced according to an embodiment of the present disclosure.
Figure 22:
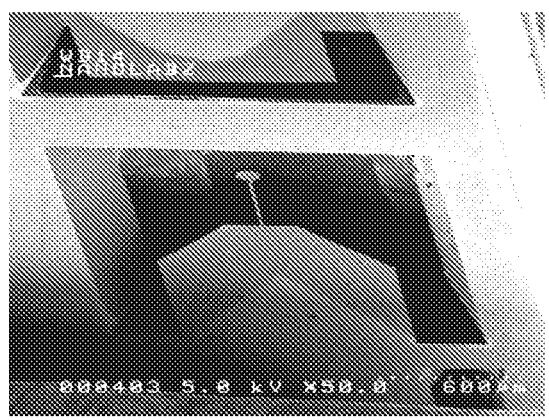
FIG. 22 is a scanning electron microscope image of a target having a cup located at the end of a cantilever produced according to an embodiment of the present disclosure.
Figure 23:
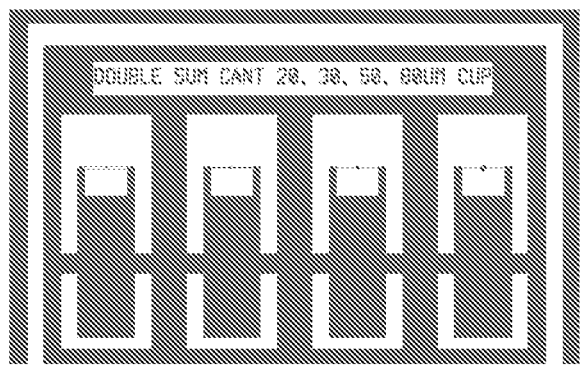
FIG. 23 is an illustrative mask layout for a photomask that may be used in etching the front side of the wafer in the process of FIGS. 14A through 14I to produce a doubly-spanned target.
Figure 24:
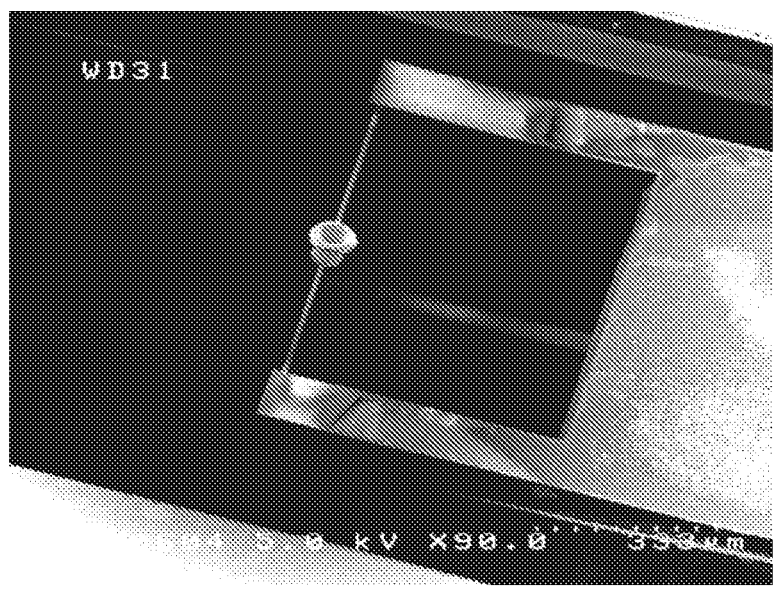
FIG. 24 is a scanning electron microscope image of a target having a cup located at the end of two cantilevers produced according to an embodiment of the present disclosure.

FIG. 23 illustrates an alternative mask that can be used in the above-described process. The mask includes a cantilever shape coupled to a handling die. A target, such as a cup shaped target, is coupled to the cantilever using spans. This doubly spanned target produced by the mask can have various advantages. For example, the target may be less likely to move, as it is supported on both sides. Although FIG. 19 illustrates a doubly spanned target, similar masks can be created to produce targets having other numbers of spans, such as targets having three or four spans. FIG. 24 is an SEM image of a target produced using the mask of FIG. 23.

The cup shaped target may have advantages over other target shapes. For example, it may prevent the pre-pulse of a laser from travelling around the target and forming a dense plasma wall on the target's backside. Such a plasma can interrupt the projection of the ion/proton/electron emission from the target. The cup can provide a comparatively uninhibited backside surface.

The mounting arm or cantilever can also have advantages. For example, it may provide a more effective and efficient mounting system for the targets, as well as generally greater ease in handling the targets. In addition, the reduced mass of the mount can minimize energy from escaping into the target holder. Thus, more energy input into the system can be focused on the target itself. Other target and mold shapes and their methods of production, including those discussed in the present disclosure, can be adapted to include the mounting arm.

Support Arm Target With Metal Slugs

In another aspect, rather than a cup, a support structure, such as a cantilever, is used to support a target having embedded metal slugs. However, the metal slug targets may also be formed without a support structure.

Figure 25A:
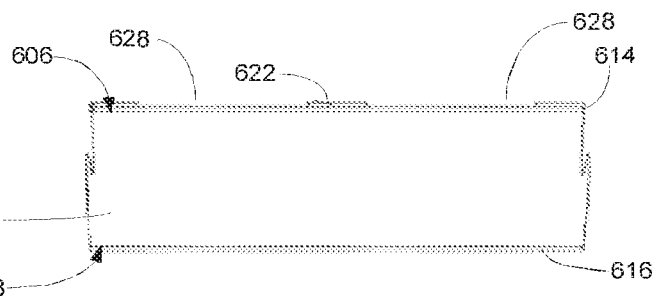

As shown in FIG. 25A, silicon nitride layers 614, 616, such as a 2 µm thick layers, are deposited on the front side 606 and back side 608 of a substrate 600, such as <100> p-type silicon. In a particular example, the silicon is double polished. In a specific implementation, the silicon nitride layers 614, 616 have comparatively low stress, which may be achieved, for example, using low pressure chemical vapor deposition. The silicon nitride layer 614 is coated with photoresist and exposed to form two windows 628 in the photoresist layer 622.

A dry etch, such as a dry reactive-ion etch, for example using the Bosch process, is used to remove the silicon nitride layer 614 underneath the windows 628.

Figure 25B:
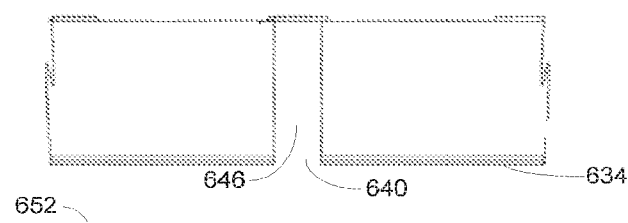

With reference to FIG. 25B, the back side 608 of the substrate 600 is coated with photoresist and exposed to form a window 640 in the photoresist layer 634. A dry etch, such as a dry reactive-ion etch, is used to etch the silicon nitride layer 616 and substrate 600 underneath the window 640. In a particular example, the etch employs $SF_6$ and $O_2$. The etch is continued until the void 646 reaches the silicon nitride layer 614 over the front side 606 of the substrate 600.

Figure 25C:
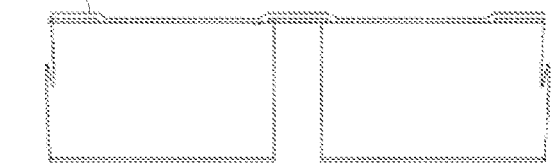

Turning now to FIG. 25C, a metal layer 652, such as a 0.5 µm layer of chromium, is deposited on the front side 606 of the substrate 600. In a particular example, the metal layer 652 is deposited by sputter coating.

Figure 25D:
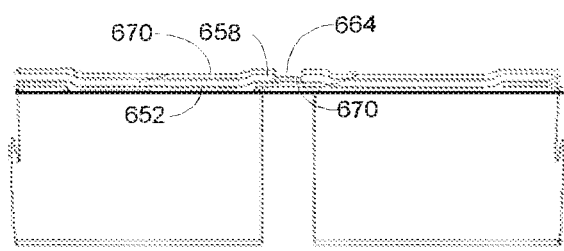

The substrate 600 is prepared for a standard metal life-off process. As shown in FIG. 25D, a thick photoresist layer 658 is deposited over the metal layer 652. The resist layer 658 is patterned with a desired feature, such as a window 664 into which a metal slug may be deposited. After developing the window 664, a metal layer 670, such as a 5 µm layer of copper, is deposited over the resist layer 658 and window 664. In one example, the metal layer 670 is deposited by evaporation. Although FIG. 25D shows a single metal layer 670, multiple metal layers may be deposited, if desired. In a more specific example, a standard metal lift-off is performed after each metal layer is deposited.

Figure 25E:
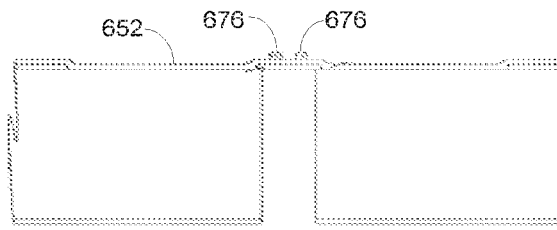

Although FIG. 25D illustrates a single window 664 where a dot or slug may be deposited, other metal patterns can be formed. For example, FIG. 25E illustrates a substrate having two metal dots 676. When the dots 676 are of the same material, they can be formed as described for FIG. 25D, except two windows are used rather than the single window 664. When different materials are desired for the dots 676, a first dot can be deposited as described for FIG. 25D. The process can then be repeated using a different mask forming a new window into which the second material can be deposited and, optionally, covering the first dot.

Figure 25F:
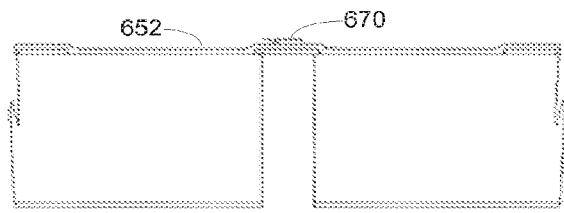

Continuing from FIG. 25D, the lift-off may be performed, in one example, by removing the portions of the metal layer 670 over the resist layer 658 by washing the substrate 600 in a sonicated acetone bath, producing the structure shown in FIG. 25F.

Typically, a standard wafer cleaning process is then performed on the substrate 600. If another metal is desired in the final target, it can then be added to the substrate 600. In one example, the substrate 600 is coated, such as by sputter coating, with another metal layer 682, such as a 5 μm aluminum layer, as shown in FIG. 25G. Standard photolithography techniques are used to deposit and pattern a resist layer 688, which is used to protect the portion of the metal layer 682 desired in the final target. The portion of the metal layer 682 not covered by resist 688 is removed, such as with a wet etch. In a particular example, PAD (available from Ashland Specialty Chemicals, of Dublin, Ohio) is used as the etchant, producing the structure shown in FIG. 25H.

A standard wafer cleaning process is then typically performed on the substrate 600. As shown in FIG. 25I, a protective metal layer 694, such as a 0.5 μm gold layer, is deposited on the front side of the substrate 600. The metal layer 694 protects the metal layer 682 while silicon in the substrate 600 is removed, such as using a KOH wet etch. KOH will etch aluminum, but not gold.

In order to remove the silicon from the substrate 600, standard photolithography techniques are used to pattern a window 698, shown in FIG. 25J, in the silicon nitride layer 616. A dry etch, such as dry reactive-ion etch, can be used to remove the silicon nitride layer 616 under the window 698. The silicon under the window 698 is then removed, such as using a wet etch, for example with a KOH etchant. The resulting structure is shown in FIG. 25K. The substrate 600 is then carefully rinsed. The resulting material is typically fragile, and so careful handling can be beneficial. For example, side to side translation of the substrate 600 can cause the target to become damaged.

The protective metal layer 694 can then be removed, producing the structure shown in FIG. 25L. When the protective layer 694 is a gold layer, it can be removed using a wet gold etch, such as using Au-5 as the etchant, as it typically will not etch other metals, such as aluminum or chromium.

In some example, the targets created using the above-describe process have metal layer thickness of less than about 20 μm, such as less than about 15 μm, less than about 10 μm, less than about 5 μm, or less than about 2 μm. In further example, the metal layer thickness is between about 1 μm and about 50 μm, such as between about 2 μm and about 20 μm. In a specific example, the metal layer has a thickness of about 10 μm. The diameter of the target is, in some examples, between about 10 μm and about 500 μm, such as between about 50 μm and about 250 μm or between about 75 μm and about 150 μm. In a specific example, the target diameter is about 25 μm. In further examples, the target diameter is less than about 50 μm, such as less than about 25 μm, or less than about 10 μm.

Figure 26:
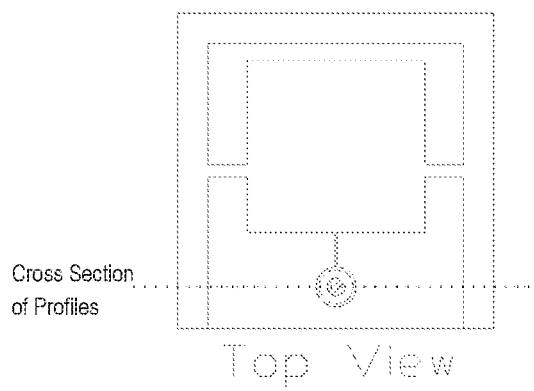
FIG. 26 is an illustration of a top plan view of a target having embedded metal slugs located at the end of a cantilever according to an embodiment of the present disclosure.
Figure 27:
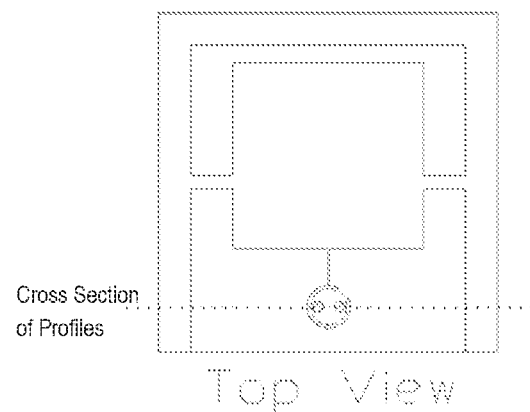
FIG. 27 is an illustration of a top plan view of a target having embedded metal slugs located at the end of a cantilever according to an embodiment of the present disclosure.
Figure 28:
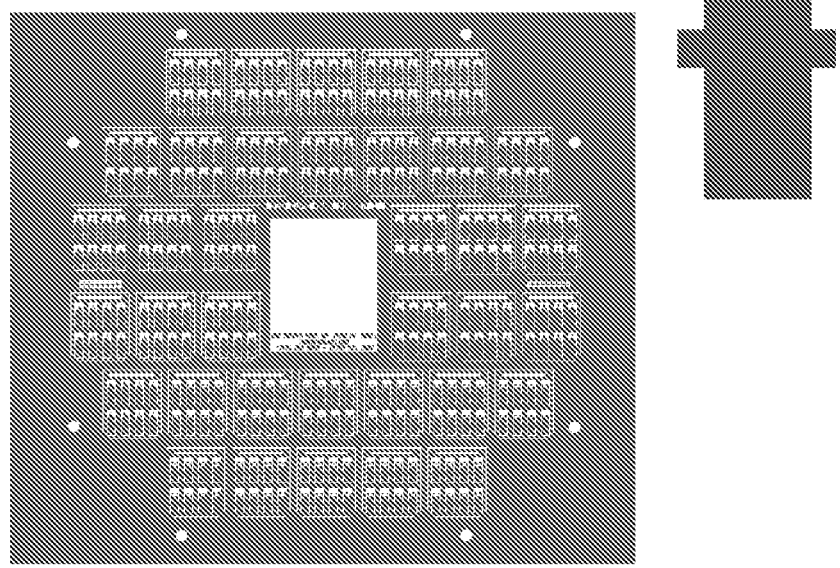
FIG. 28 is an illustrative mask layout for a photomask that may be used in etching the front side of the wafer in the process of FIGS. 25A through 25L.

FIG. 26 is a cross sectional view of a target formed using the above-described process and having a single metal-containing dot. FIG. 27 is a cross sectional view of a target formed using the above-described process and having two metal containing dots. FIG. 28 is an image of a mask useable in the above-described process.

Figure 29:
FIG. 29 is a scanning electron microscope image of a target having embedded metal slugs located at the end of a cantilever according to an embodiment of the present disclosure.
Figure 30:
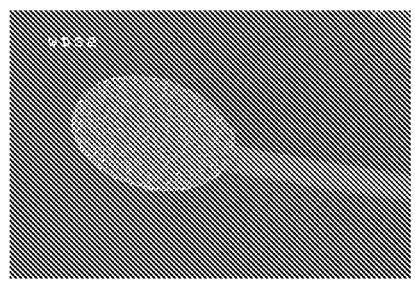
FIG. 30 is a scanning electron microscope image of a target having embedded metal slugs located at the end of a cantilever according to an embodiment of the present disclosure.
Figure 31:
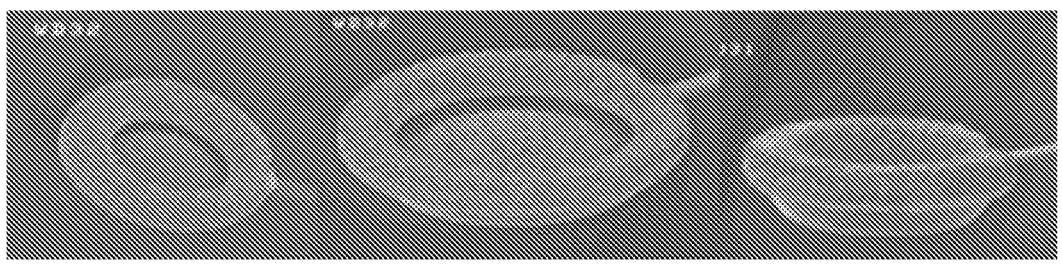
FIG. 31 is a scanning electron microscope image of a target having embedded metal slugs located at the end of a cantilever according to an embodiment of the present disclosure.

FIGS. 29-30 are SEM images of a target formed using the above-described process and having a single metal-containing dot. FIG. 31 is an SEM image of a target formed using a variation of the above-described procedure having a bowl-like structure. This structure can be produced by the above-described method, but omitting the silicon dioxide layer from the front side of the substrate. The silicon nitride etching process will also etch the underlying silicon to a degree, creating a void over which the metals can then be deposited. Thus, the silicon dioxide layer as a protective layer for the substrate during silicon nitride layer etching.

Dotted Metal Foil

Figure 32A:
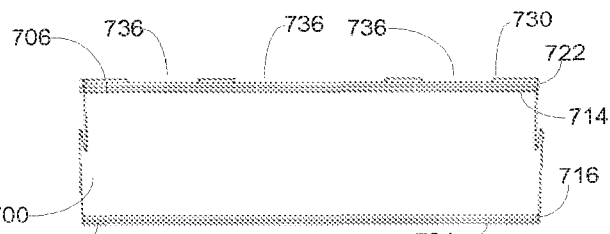
FIGS. 32A-32K are cross sectional diagrams illustrating a process for forming molds and targets having metal dots located on a metal foil.

In some embodiments, it may be useful to have a target formed from a metal foil and having metal dots disposed on a surface of the foil. As shown in FIG. 32A, silicon dioxide layers 714, 716, such as 4 μm layers, are deposited on the front 706 and back 708 sides of a substrate 700, such as <100> p-type silicon. In a particular example, the silicon is double polished. Silicon nitride layers 722, 724, such as 2 μm thick layers, are then deposited on the silicon dioxide layers 714, 716. The silicon nitride layers 722, 724 are typically deposited so that they have comparatively low stress, such as using low pressure chemical vapor deposition.

Figure 32B:
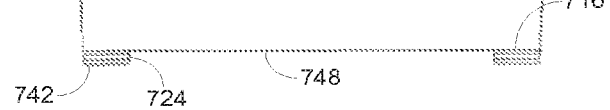

As shown in FIG. 32B, a photoresist layer 730 is deposited on the silicon nitride layer 722 and patterned to form three windows 736. A dry etch, such as dry reactive-ion etch, is used to remove the silicon nitride layer 722 under the windows 736. The dry etch process can be monitored visually.

A photoresist layer 742 is deposited on the silicon nitride layer 724 and patterned to form a window 748. The silicon nitride layer 724 beneath the window 748 is etched, such as using a dry etch, for example a dry reactive-ion etch. The silicon dioxide layer 716 under the window 748 is then etched, such as using a wet etch. In a specific example, the wet etch is performed using a 6:1 BOE etchant.

Figure 32C:
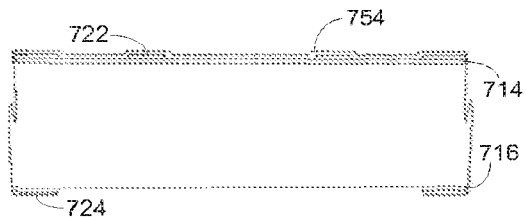

A metal layer 754 is deposited on the front side 706 of the substrate 700, as shown in FIG. 32C. The metal layer 706 may be applied, in one example, by sputter coating, such as a 0.5 μm layer of gold.

Figure 32D:
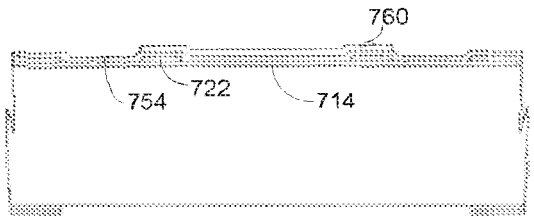

With reference to FIG. 32D, a photoresist layer 760 is deposited on the metal layer 754 and exposed such that only the metal which is desired to remain after a subsequent etch step is coated with the photoresist layer 760.

Figure 32E:
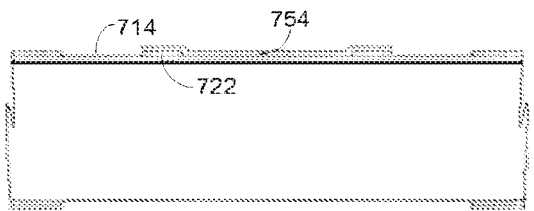
Figure 32F:
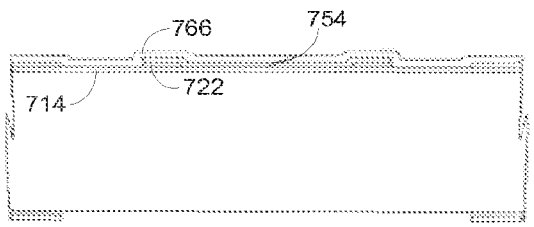

A metal etch, such as a wet metal etch, is used to remove the portion of the metal layer 754 not covered by the photoresist layer 760, as shown in FIG. 32E. In one example, Au-5 is used as the etchant, as it can remove gold yet typically does not etch the photoresist.

Figure 32G:
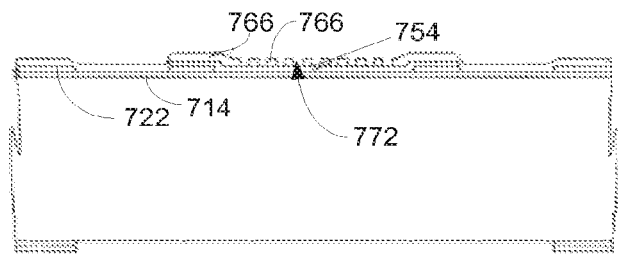

A photoresist layer 766 is then applied to the front side 706 of the substrate 700 in preparation for a standard metal lift-off step. Typically the substrate 700 is cleaned prior to depositing the photoresist layer 766. The photoresist layer 766 is then patterned as desired, such as using a glass plate mask, to produce desired features of interest 772, as shown in FIG. 32G. In one example, the features of interest 772 are a pattern or array of shapes, such as circles or squares.

Figure 32H:
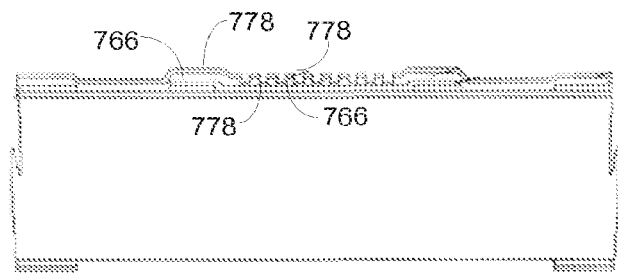

With reference to FIG. 32H, a metal layer 778 is deposited on the front side 706 of the substrate 700, such as by evaporation. In one example, the metal layer 778 is about 1 μm of copper.

Figure 32I:
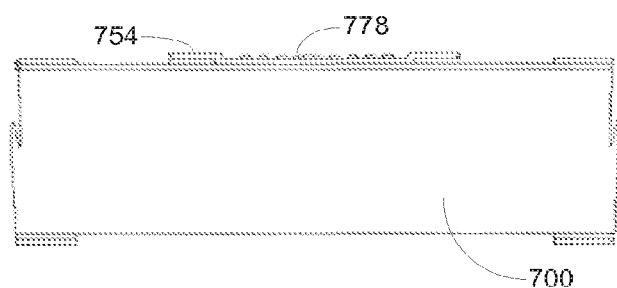

The metal lift-off process is completed, in one example, by soaking the substrate 700 in a sonicated acetone bath. Portions of the metal layer 778 located over photoresist 766 will be removed, as shown in FIG. 32I. In the case of the specifically described example, an array of copper dots is located on a gold metal foil.

Figure 32J:
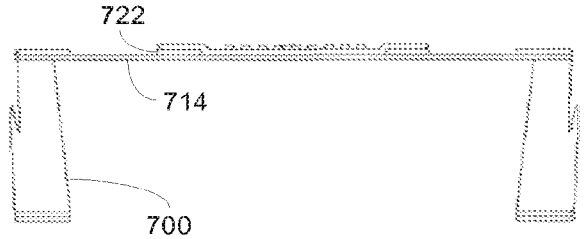

FIG. 32J illustrates the substrate 700 after silicon has been removed, such as by performing a wet etch. In a specific example, the etchant is KOH. This step produces a freestanding metal film located on a silicon dioxide/silicon nitride spatula.

Figure 32K:
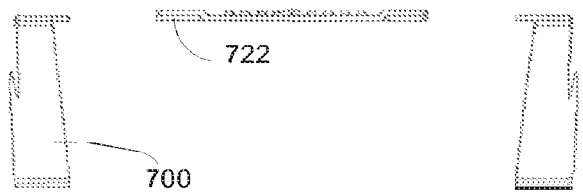

The substrate 700 is typically rinsed and cleaned. The silicon dioxide layer 714 can be removed using a suitable etch, such as a wet etch using 6:1 BOE. As shown in FIG. 32K, this step produces a bilayer metal foil that is spanned on a silicon nitride four-pronged spatula having an open window in the center, which can reduce interference with a laser.

In some example, the targets created using the above-describe process have metal layer thickness of less than about 20 µm, such as less than about 15 µm, less than about 10 µm, less than about 5 µm, or less than about 2 µm. In further example, the metal layer thickness is between about 1 µm and about 50 µm, such as between about 2 µm and about 20 µm. In a specific example, the metal layer has a thickness of about 10 µm. In some examples, the dots have a diameter of less than about 25 µm, such as less than about 10 µm, less than about 5 µm, less than about 2 µm, or less than about 1 µm. The thickness of the dots is, in some examples, between about 10 nm and about 5000 nm, such as between about 100 nm and about 1000 nm or between about 250 nm and about 750 nm. In a specific example, the thickness of the dots is about 500 nm. In further examples, the spacing between dots is between about 25 µm and about 500 µm, such as between about 50 µm and about 250 µm. In a particular example, the spacing between dots is about 100 µm.

Figure 33:
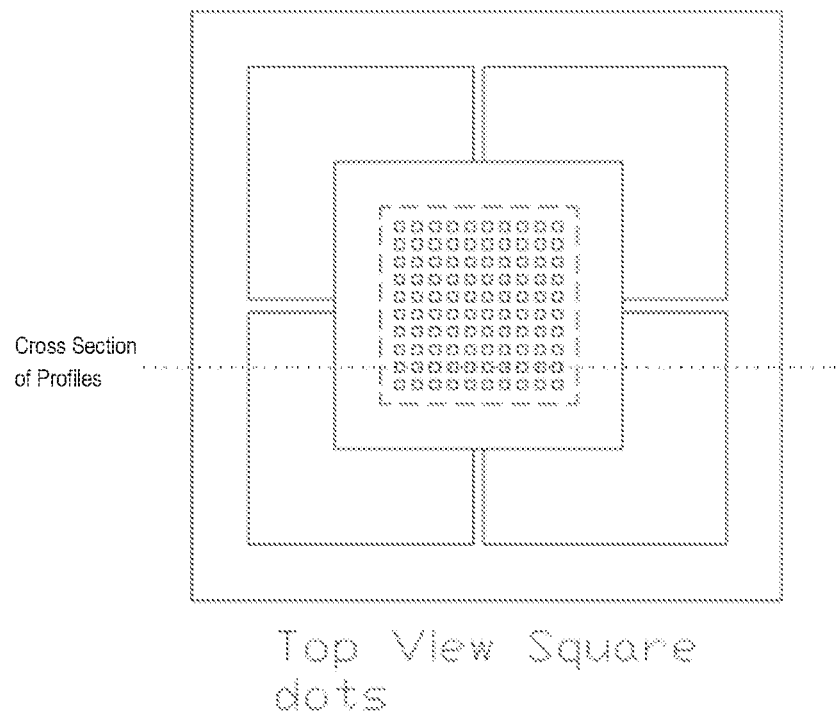
FIG. 33 is an illustration of a top plan view of a metal foil target having square metal dots disposed thereon according to an embodiment of the present disclosure.
Figure 34:
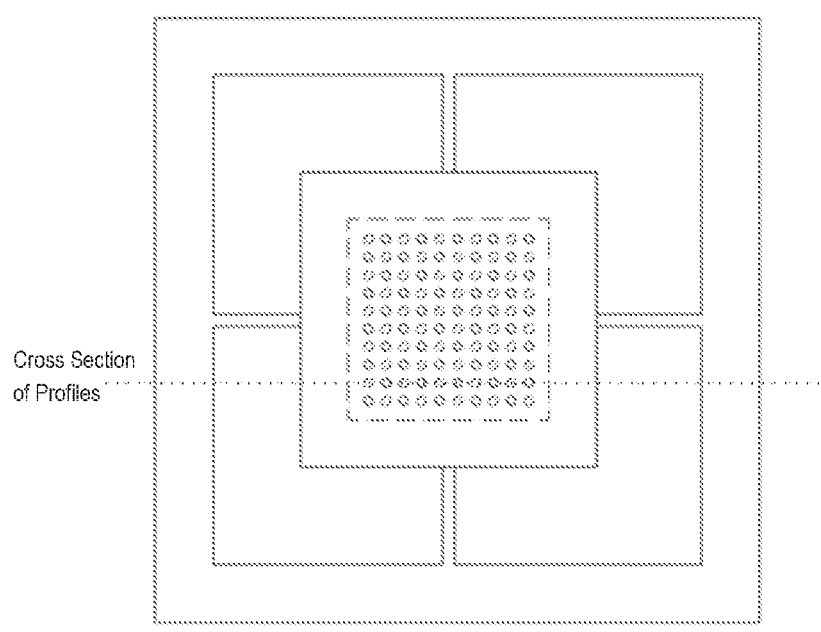
FIG. 34 is an illustration of a top plan view of a metal foil target having circular metal dots disposed thereon according to an embodiment of the present disclosure.

FIG. 33 is a top view of a foil dotted with squares produced according to the above-described method. FIG. 34 is a top view of a foil dotted with circles produced according to the above-described method.

Metal Foil Wedge Targets

Figure 35A:
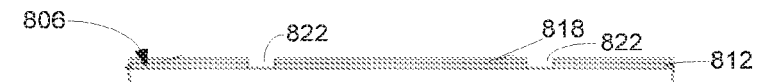
FIGS. 35A-35I are cross sectional diagrams illustrating a process for forming molds and targets having a wedge shape.

Another embodiment of the present disclosure provides wedge-shaped metal foil targets. A process for producing such targets is illustrated in FIGS. 35A-35I. As illustrated in FIG. 35A, front 806 and back 808 sides of a substrate 800, such as <100> p-type silicon, are coated with silicon nitride layers 812, 814. In a particular example, the silicon is double polished. In at least some examples, the silicon nitride layers 812, 814 are deposited so that they have comparatively low stress, such as by low pressure chemical vapor deposition. In a specific example, the silicon nitride layers 812, 814 have a thickness of about 2 µm.

A photoresist layer 818 is deposited on the silicon nitride layer 812, patterned, and developed to open two windows 822. The silicon nitride layer 812 under the windows 822 is then etched, such as using a dry etch.

Figure 35B:
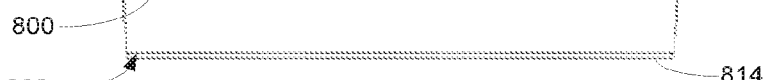

With reference to FIG. 35B, a photoresist layer 826 is deposited on the front side 806 of the substrate. The photoresist layer 826 is then patterned and developed to open a window 830 between the windows 822.

Figure 35C:
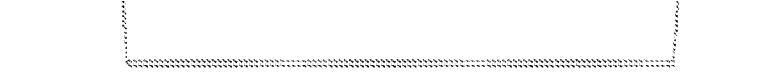

A metal layer 834 is deposited on the front side 806 of the substrate 800, as shown in FIG. 35C. In some implementations, the metal is deposited by evaporation. The metal layer 834, in a specific example, is a 10 µm layer of aluminum.

Figure 35D:
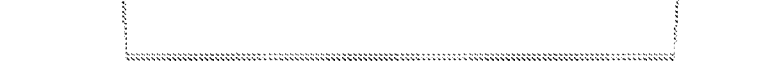

A standard lift off procedure is used to remove portions of the metal layer 834 overlying the photoresist layer 826. For example, the substrate 800 may be placed in a sonicated acetone bath. The resulting structure is shown in FIG. 35D.

Figure 35E:

With reference to FIG. 35E, a photoresist layer 838 is deposited on the silicon nitride layer 814 on the back side 808 of the substrate 800. The photoresist layer 838 is patterned and developed to open windows 842 corresponding to windows 822 and 830. The silicon nitride layer 814 and a portion of the substrate 800 under the windows 842 is removed using a suitable etch. In one example, the etch is a deep silicon anisotropic etch.

Figure 35F:

The front side 806 is mechanically ground, such as using a die, to produce a metal layer 834 having a desired angle, as shown in FIG. 35F. The die is typically positioned at the center of the substrate 800 in order to improve the accuracy and symmetry of the grinding process.

Figure 35G:
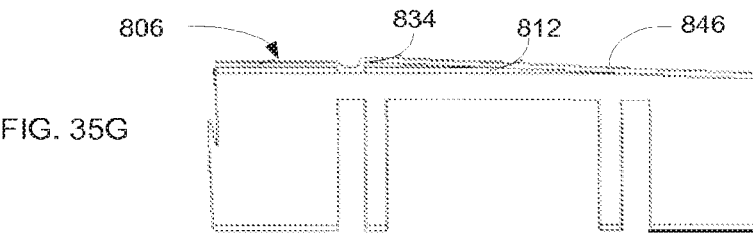
Figure 35H:
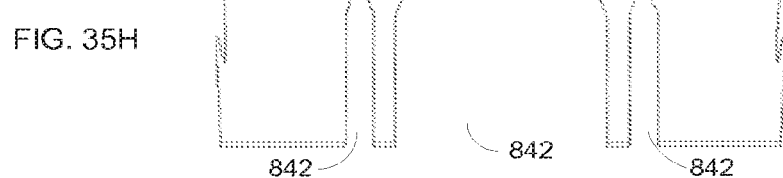

With reference to FIG. 35G, when the metal layer 834 may be etched during subsequent steps, it may be desirable to deposit a protective metal layer 846 over the metal layer 834. In one example, the protective metal layer 846 is deposited by sputter coating the front side 806 of the substrate 800. The protective metal layer 846 may be a gold layer, such as a 0.5 µm thick gold layer.

An etch, such as a wet etch, is then used to remove remaining substrate 800 under the windows 842. In a specific example, KOH is used as the etchant. The etch results in the structure shown in FIG. 35H.

In some example, the targets created using the above-describe process have metal layer thickness of less than about 20 µm, such as less than about 15 µm, less than about 10 µm, less than about 5 µm, or less than about 2 µm. In further example, the metal layer thickness is between about 1 µm and about 50 µm, such as between about 2 µm and about 20 µm. In a specific example, the metal layer has a thickness of about 10 µm.

Figure 35I:
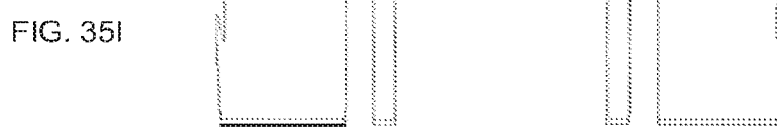

The protective metal layer 846 may then be removed to produce the structure shown in FIG. 35I, such as using a suitable etching process. When the protective metal layer 846 is a gold layer, it may be removed using an Au-5 wet etch.

Figure 36:
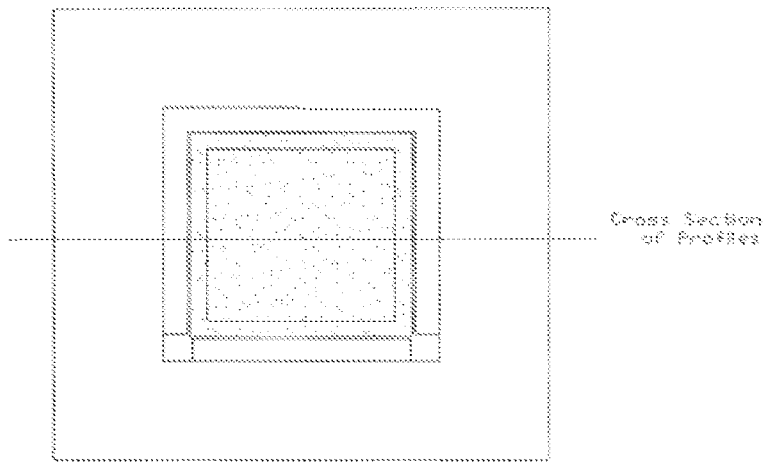
FIG. 36 is an illustration of a top plan view of a metal foil target having a wedge shape according to an embodiment of the present disclosure.

A top view of a target formed according to the present disclosure is shown in FIG. 36.

Stacked Metal Foils

Another embodiment of the present disclosure provides a stacked metal foil target and a method for their fabrication. The fabrication process is summarized in FIGS. 37A-37M.

Figure 37A:
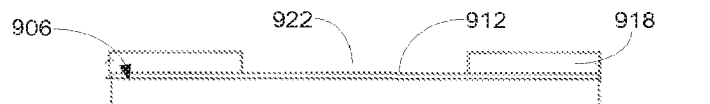

With reference first to FIG. 37A, the front 906 and back 908 sides of a substrate 900, such as <100> p-type silicon, are coated to form silicon nitride layers 912, 914. In a particular example, the silicon is double polished. In some examples, the silicon nitride layers 912, 914 are deposited in a manner such that they have comparatively low stress, such as using low pressure chemical vapor deposition. A photoresist layer 918 is deposited over the silicon nitride layer 912. The photoresist layer 918 is then patterned and developed to open a central window 922.

One or more metal layers are deposited in the window 922. The following discussion provides an example of a process for producing a specific target. However, this process can be varied depending on the number of metal layers desired, types of metal layers desired, and order of metals.

Figure 37B:
Figure 37C:
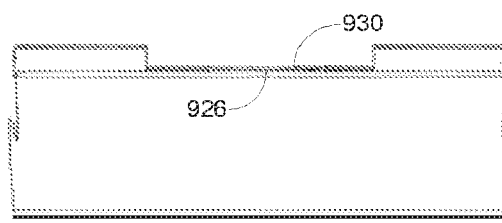
Figure 37D:
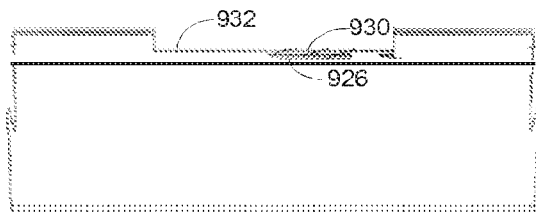
Figure 37E:
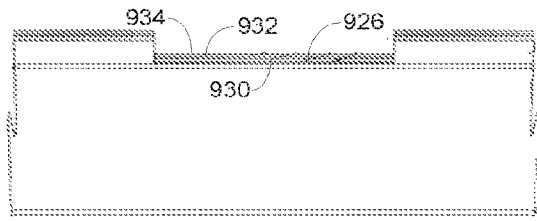
Figure 37F:
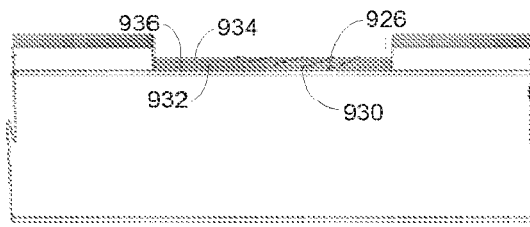
Figure 37G:
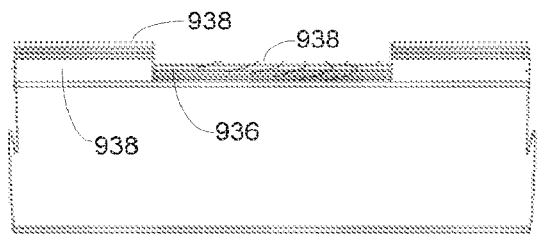

With reference to FIG. 37B, a first metal layer 926, such as a 100 nm layer of aluminum, is deposited in the window 922. In a particular example, the aluminum is deposited by evaporation. A second metal layer 930, such as 1 µm of copper, is deposited over the first metal layer, such as by evaporation, as shown in FIG. 37C. This process is repeated for additional layers, such as a 50 nm layer of titanium 932 (FIG. 37D), a 6 µm layer of copper 934 (FIG. 37E), a 50 nm vanadium layer 936 (FIG. 37F), and a 6 µm copper layer 938 (FIG. 37G).

Figure 37H:
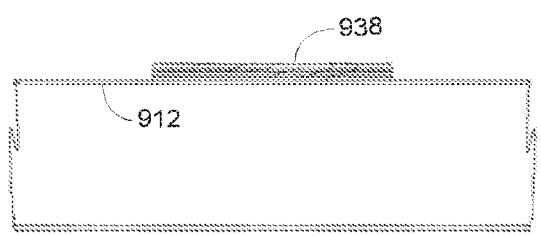
Figure 37I:
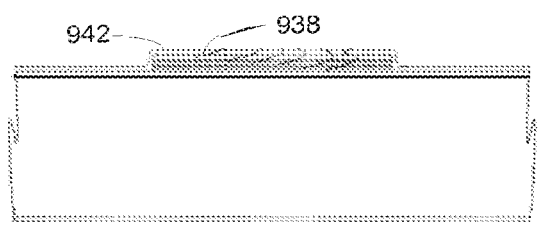

Once the desired metal layers have been deposited, unwanted metal portions located above the photoresist layer 918 can be removed using a standard lift off technique to produce the structure shown in FIG. 37H. In a specific implementation, the substrate 900 is sonicated in an acetone bath. A protective metal layer 942, shown in FIG. 37I, is deposited over the upper metal layer 938, in some examples, to protect the metal layers during further processing of the substrate 900. In one example, the protective metal layer 942 is deposited by sputter coating. The protective metal layer 942 is, in one example, a 0.5 µm gold layer.

Figure 37J:
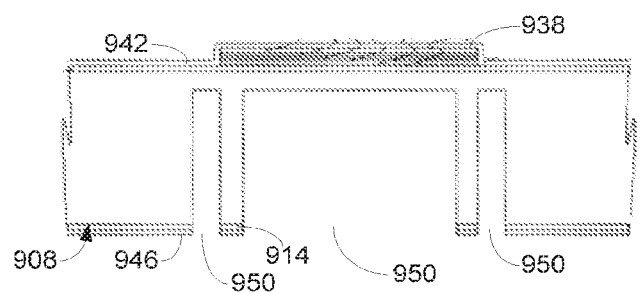
Figure 37K:
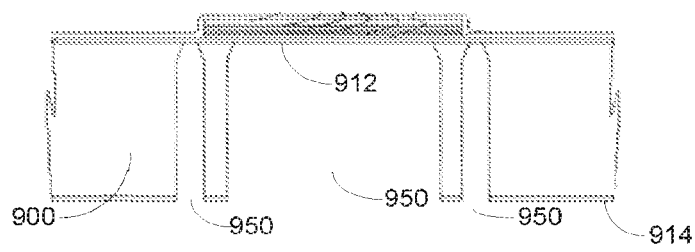

With reference now to FIG. 37J, a photoresist layer 946 is deposited on the back side 908 of the substrate 900, patterned, and developed to expose windows 950. The silicon nitride layer 914 and substrate 900 under the windows 950 are etched using suitable techniques, such as a silicon nitride dry etches followed by a deep anisotropic silicon etch. Remaining substrate 900 under the windows 950 is then removed using a suitable wet etch, such as using a KOH etchant, to produce the structure shown in FIG. 37K. The substrate 900 is typically cleaned after the wet etch.

Figure 37L:
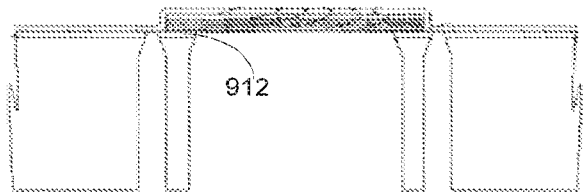

As shown in FIG. 37L, a suitable etch, such as a dry silicon nitride etch, is used to remove the exposed silicon nitride layers 912, 914. Finally, the protective metal layer 942 is removed to produce the structure shown in FIG. 37M. When the protective metal layer 942 is a gold layer, it may be removed using Au-5 as the etchant. The resulting target is a metal stack suspended over a hollow silicon die.

In some example, the targets created using the above-describe process have metal layer thickness of less than about 20 µm, such as less than about 15 µm, less than about 10 µm, less than about 5 µm, or less than about 2 µm. In further example, the metal layer thickness is between about 1 µm and about 50 µm, such as between about 2 µm and about 20 µm. In a specific example, the metal layer has a thickness of about 10 µm.

Figure 39:
FIG. 39 is a scanning electron microscope image of a target having multiple metal layers located at the end of a cantilever according to an embodiment of the present disclosure.
Figure 40:
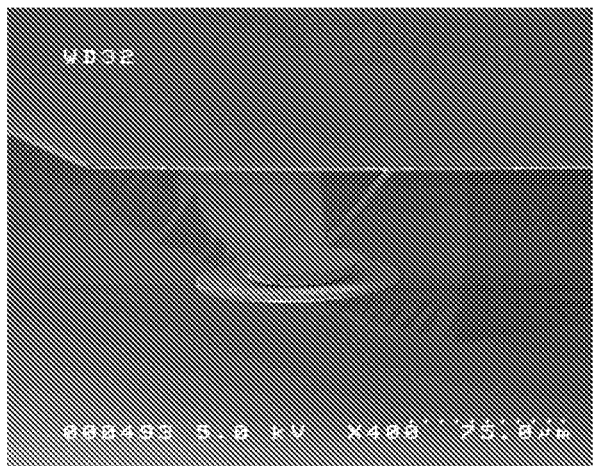
FIG. 40 is a scanning electron microscope image of a target having multiple metal layers located at the end of a cantilever according to an embodiment of the present disclosure.
Figure 41:
FIG. 41 is a scanning electron microscope image of a target having multiple metal layers located at the end of a cantilever according to an embodiment of the present disclosure.

FIG. 38 is a top view of a metal target formed using the above described method. FIGS. 39-41 are SEM images of metal foil stack targets produced using the above technique attached to a silicon nitride cantilever.

Winston Collector Having a Hemispherical Apex

A Winston collector target having a hemispherical apex is provided by another aspect of the present disclosure. A process for manufacturing the target is described in FIGS. 42A-42I. As shown in FIG. 42A, standard photolithography techniques are used to deposit a photoresist layer 1012 on the backside 1008 of a substrate 1000, such as <100> p-type silicon. In a particular example, the silicon is double polished. The photoresist layer 1012 is patterned and developed to expose a window 1018.

With reference to FIG. 42B, an inverse hemisphere 1024 is opened under the window 1018, such as using a dry etch, for example an isotropic dry silicon etch. The photoresist layer 1012 is removed and a silicon nitride layer 1030, such as a 1 µm thick layer, is deposited on the back side 1008 of the substrate 1000, as shown in FIG. 42C. In a particular example, the entire substrate 1000 is coated with silicon nitride, such as using low pressure chemical vapor deposition, and the silicon nitride is removed from the front side 1006 of the substrate using a blanket etch-leaving only the silicon nitride layer 1030.

Turning to FIG. 42D, a silicon dioxide layer 1036, such as a 4 µm thick thermal silicon dioxide layer, is formed on the front side 1006 of the substrate 1000. Standard photolithography processes are used to deposit a photoresist layer 1042 on the silicon dioxide layer 1036, as shown in FIG. 42E. The photoresist layer 1042 is patterned and developed to form a window 1048. The silicon dioxide layer 1036 under the window 1048 is etched using a suitable process, such as a using a dry silicon dioxide etch. In a specific example, the window 1048 is circular.

A deep isotropic etch is performed on the front side 1006 of the substrate 1000. FIG. 42F shows the results of this process, where a cavity 1054 is formed under the window 1048. In a particular example, the deep isotropic etch is a Bosch process or a variant thereof. For example, eliminating the side-wall passivation step of the Bosch process can produce a cavity 1054 having a Gaussian profile.

The front side 1006 of the substrate 1000 is then blanket etched to remove the silicon dioxide layer 1036, as shown in FIG. 42G. With reference to FIG. 42H, a desired metal layer 1060 is then deposited on the front side 1006 of the substrate 1000. In a particular example, the metal layer 1060 is deposited by sputter coating. The metal layer 1060 is a 10 µm gold layer, in a specific example.

The silicon nitride layer 1030 and a portion of the substrate 1000 thereunder are etched, such as using a wet etch. The etchant, in a particular example, is KOH. In at least some implementations, the etch is timed to leave a portion of the substrate 1000 to act as a handling die. The final target is shown in FIG. 42I. A top view of the target is shown in FIG. 43.

In some example, the targets created using the above-describe process have metal layer thickness of less than about 20 µm, such as less than about 15 µm, less than about 10 µm, less than about 5 µm, or less than about 2 µm. In further example, the metal layer thickness is between about 1 µm and about 50 µm, such as between about 2 µm and about 20 µm. In a specific example, the metal layer has a thickness of about 10 µm. The height of the targets is, in some examples, between about 50 µm and about 500 µm, such as between about 100 µm and about 250 µm or between about 150 µm and about 300 µm. In some examples, the full width at the half maximum height of the target is between about 10 µm and about 500 µm, such as between about 15 µm and about 350 µm or between about 30 µm and about 300 µm.

The Winston collector with the hemisphere apex may be used, in some examples, as a hohlraum. The hemisphere can focus incident laser energy to produce a hot spot away from the target.

Open Apex Winston Collector

Figure 44A:
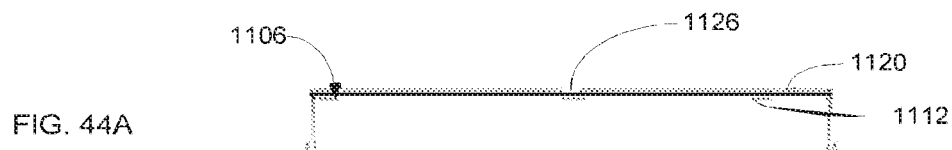
FIGS. 44A-44J are cross sectional diagrams illustrating a process for forming a target or mold formed in the shape of a Winston collector and having an aperture at the apex.

A Winston collector target with an aperture at its apex is provided by another aspect of the present disclosure. A process for producing this target is summarized in FIGS. 44A-44J. With reference first to FIG. 44A, silicon nitride layers 1112, 1114, such as 2 µm thick layers deposited by low pressure chemical vapor deposition, or another process that produces silicon nitride layers having relatively low stress, are formed on the front 1106 and back 1108 sides of a substrate 1100, such as <100> p-type silicon. In a particular example, the silicon is double polished. Standard photolithography techniques are used to deposit a photoresist layer 1120 on the silicon nitride layer 1112. The photoresist layer 1120 is patterned and developed to open a window 1126 in the photoresist layer 1120.

Figure 44B:
Figure 44C:
Figure 44D:
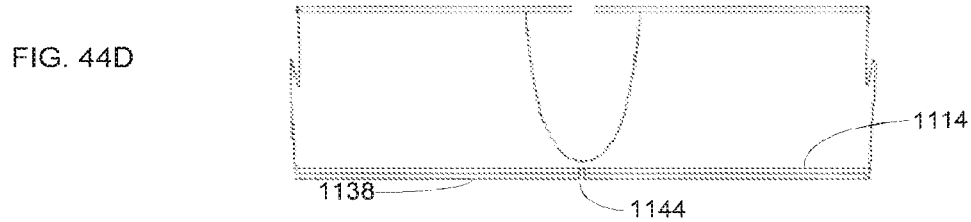

The silicon nitride layer 1112 under the window 1126 is etched using a suitable process, such as a dry etch, to produce the structure shown in FIG. 44B. Visual inspection can be used to verify when the silicon nitride layer 1112 has been completely etched. Turning to FIG. 44C, a cavity 1132 is opened under the window 1126 using a suitable etching process. In a particular example, the etch is a deep isotropic dry etch, such as using the Bosch process. The Bosch process can be controlled to vary the shape of the cavity 1132. For example, eliminating the sidewall passivation step can produce a cavity 1132 having a Gaussian-like profile.

Figure 44E:

The photoresist layer 1120 is removed and the back side 1108 of the substrate 1100 is coated with a photoresist layer 1138. The photoresist layer 1138 is patterned and developed to produce a window 1144. The silicon nitride layer 1114 under the window 1144 is etched away, such as using a dry etch, to produce the structure shown in FIG. 44D. As shown in FIG. 44E, the photoresist layer 1138 and the silicon nitride layer 1112 are then removed. In a particular example, the silicon nitride layer 1112 is removed using a blanket dry etch.

Figure 44F:
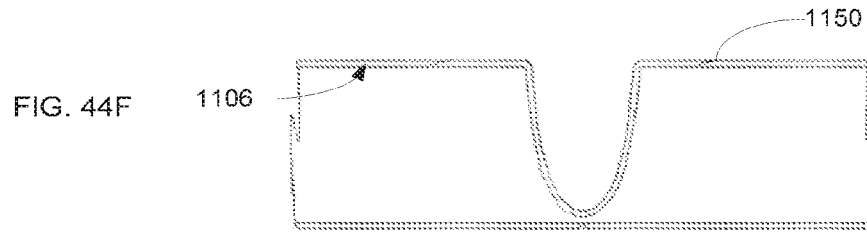

A desired metal layer 1150 is formed on the front side 1106 of the substrate, such as by sputter coating, producing the structure shown in FIG. 44F. In a particular example, the metal layer 1150 is a 10 µm layer of gold.

Figure 44G:
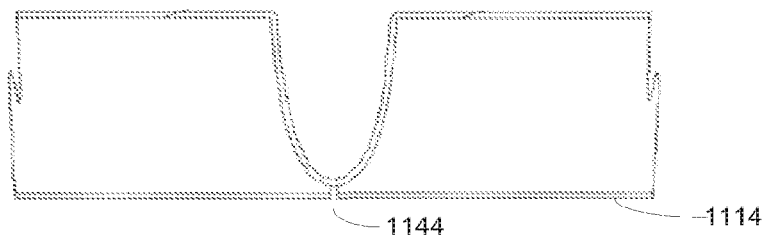
Figure 44H:
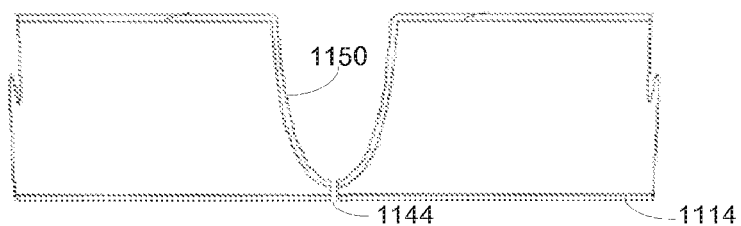

FIG. 44G illustrates the structure formed after the substrate 1100 under the window 1144 has been etched. In a particular example, the etch is a dry etch. The silicon nitride layer 1114 acts as a mask for this etching process. Next, with reference to FIG. 44H, the metal layer 1150 over the window 1144 is etched away. This step may be performed using a wet or dry etch. When a wet etch is used, the entire substrate 1100 is typically not placed in the etchant. Rather, the etchant is contact with the back side 1108 of the substrate 1100. Optical inspection, such as with a microscope, can be used to verify that the etch is complete.

Figure 44I:
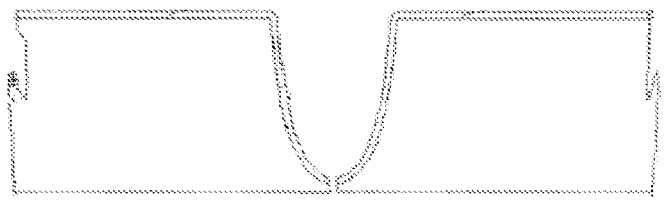
Figure 44J:
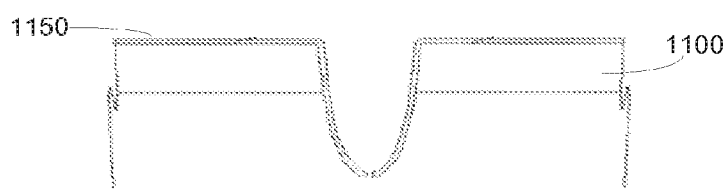
Figure 45:
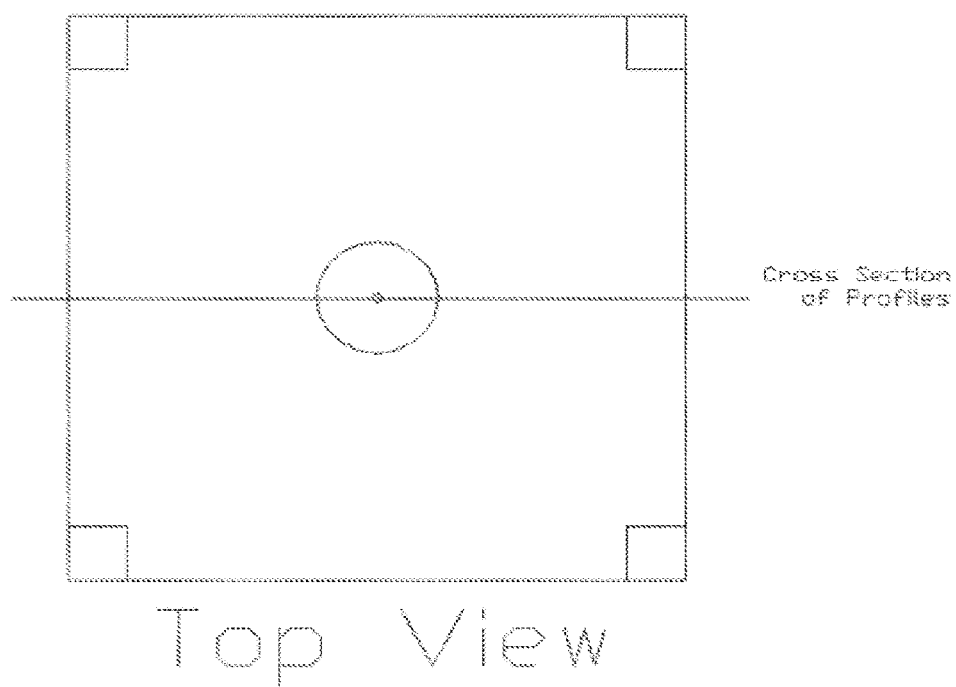
FIG. 45 is an illustration of a top plan view of a target or mold formed in the shape of a Winston collector and having an aperture at the apex according to an embodiment of the present disclosure.

Typically, the substrate 1100 is then cleaned and the remaining silicon nitride layer 1114 is removed, such as using a blanket dry etch, producing the structure shown in FIG. 44I. Finally, as shown in FIG. 44J, the back side 1108 of the substrate 1100 is etched. When the metal layer 1150 is a gold layer, KOH may be used as the etchant, as gold is impervious to KOH. A top view of the target formed from this method is shown in FIG. 45.

In some example, the targets created using the above-describe process have metal layer thickness of less than about 20 µm, such as less than about 15 µm, less than about 10 µm, less than about 5 µm, or less than about 2 µm. In further example, the metal layer thickness is between about 1 µm and about 50 µm, such as between about 2 µm and about 20 µm. In a specific example, the metal layer has a thickness of about 10 µm. The height of the targets is, in some examples, between about 50 µm and about 500 µm, such as between about 100 µm and about 250 µm or between about 150 µm and about 300 µm. In some examples, the full width at the half maximum height of the target is between about 10 µm and about 500 µm, such as between about 15 µm and about 350 µm or between about 30 µm and about 300 µm.

The Winston collector with the hemisphere apex may be used, in some examples, as a hohlraum. The hemisphere can focus incident laser energy to produce a hot spot away from the target.

The Winston collector shape may be useful in focusing incident laser radiation to a desired point. The incident angles of the Winston collector are all tangent to the center of the apex. Thus, laser alignment with the target can be less of a concern.

Target Alignment System

In addition to targets, the present disclosure provides an apparatus for aligning targets. For example, the targets may be aligned such that radiation hitting one target is directed to one or more other targets. In one example, the target alignment apparatus includes apertures formed in a substrate into which targets, such as targets attached to handling die, may be placed. The depth and orientation of the apertures may be controlled to provide the desired target orientation.

Figure 46A:
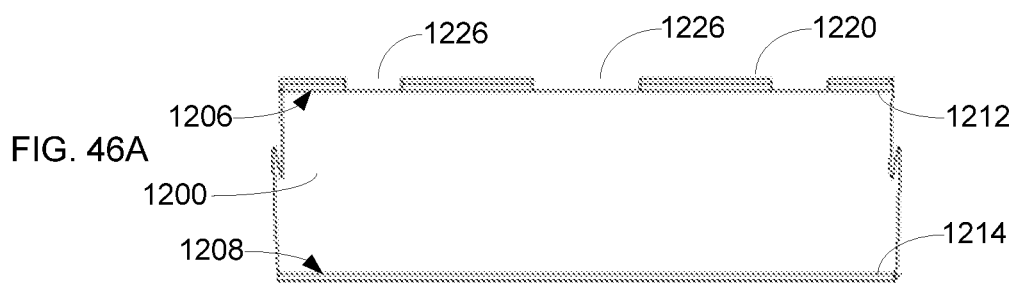
FIGS. 46A-46C are cross sectional diagrams illustrating a process for forming a target mounting apparatus according to an aspect of the present disclosure.
Figure 46B:
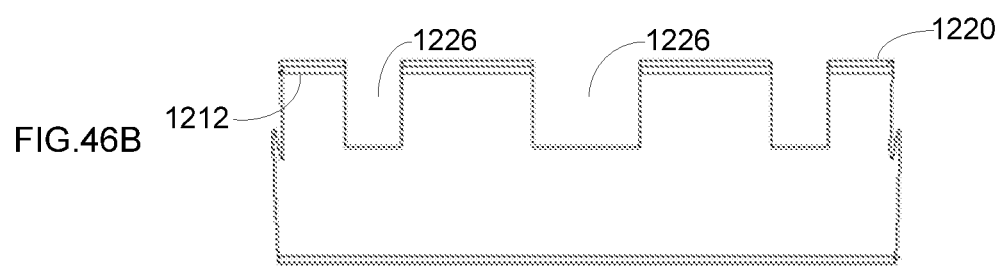
Figure 46C:
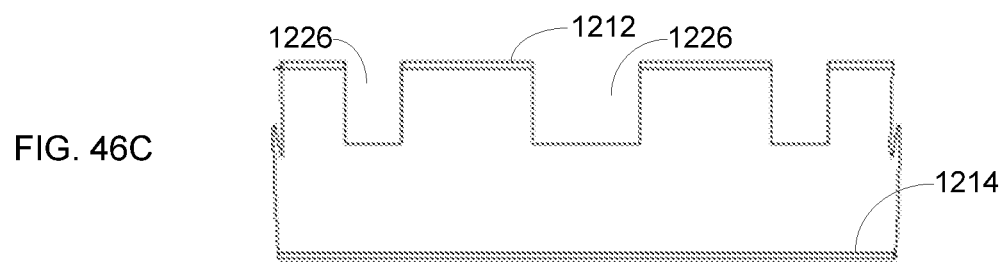

A process for producing a target alignment apparatus is illustrated in FIGS. 46A-46C.

With reference first to FIG. 46A, silicon nitride layers 1212, 1214 are formed on the front 1206 and back 1208 sides of a substrate 1200, such as <100> p-type silicon. In a particular example, the silicon is double polished. A photoresist layer 1220 is deposited on the silicon nitride layer 1212 and patterned to open windows 1226. The silicon nitride layer 1212 under the windows 1226 is then removed, such as using a dry etch.

The substrate 1200 underneath the windows 1226 is then removed to produce the structure shown in FIG. 46B. In a specific example, the substrate 1200 is removed using a deep anisotropic silicon dry etch, such as the Bosch process. Finally, the photoresist layer 1220 is removed, producing the structure shown in FIG. 45C.

Although three windows 1226 are illustrated in FIG. 46C, the target apparatus may have more or fewer windows. In addition, the depth of the windows 1226 may be controlled, such as by forming the windows 1226 through multiple mask-etch cycles.

In examples, the target apparatus has dimensions of between about 1 mm×1 mm×1 mm and about 50 mm×50 mm×50 mm, such as between about 2 mm×2 mm×3 mm and about 10 mm×10 mm×12 mm. In a specific example, the target apparatus has dimensions of about 4 mm×4 mm×5 mm.

Figure 47:
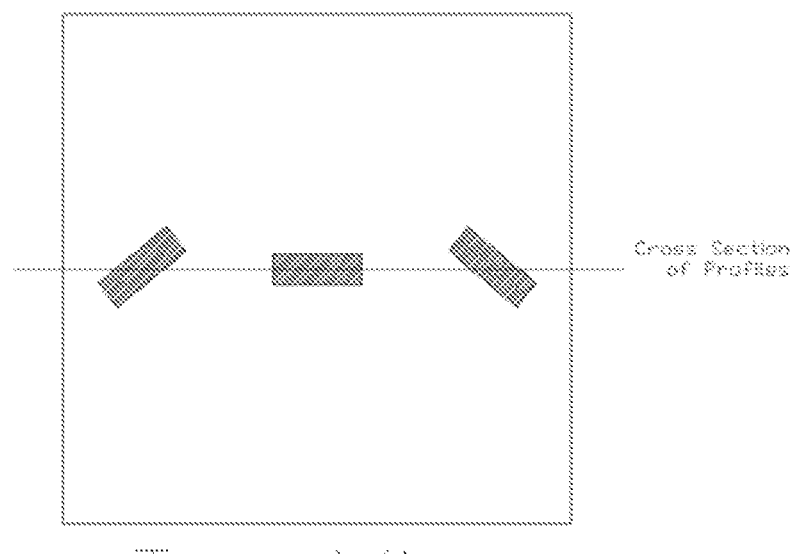
FIG. 47 is an illustration of a top plan view of a target mounting apparatus according to an embodiment of the present disclosure.
Figure 48A:
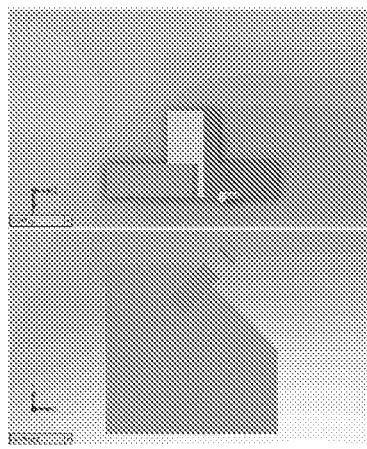
Figure 48C:
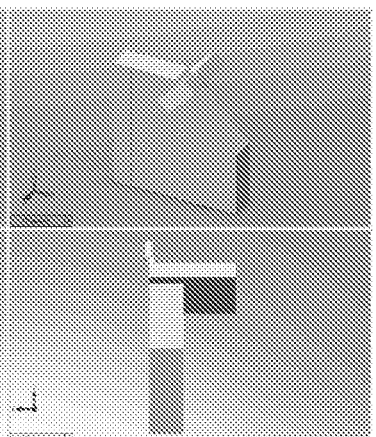
Figure 48E:
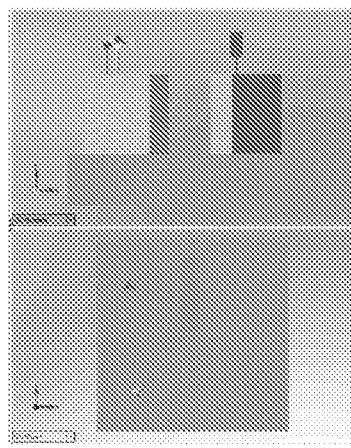
Figure 48G:
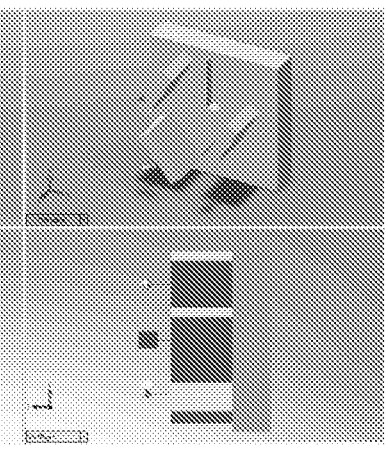
Figure 49:
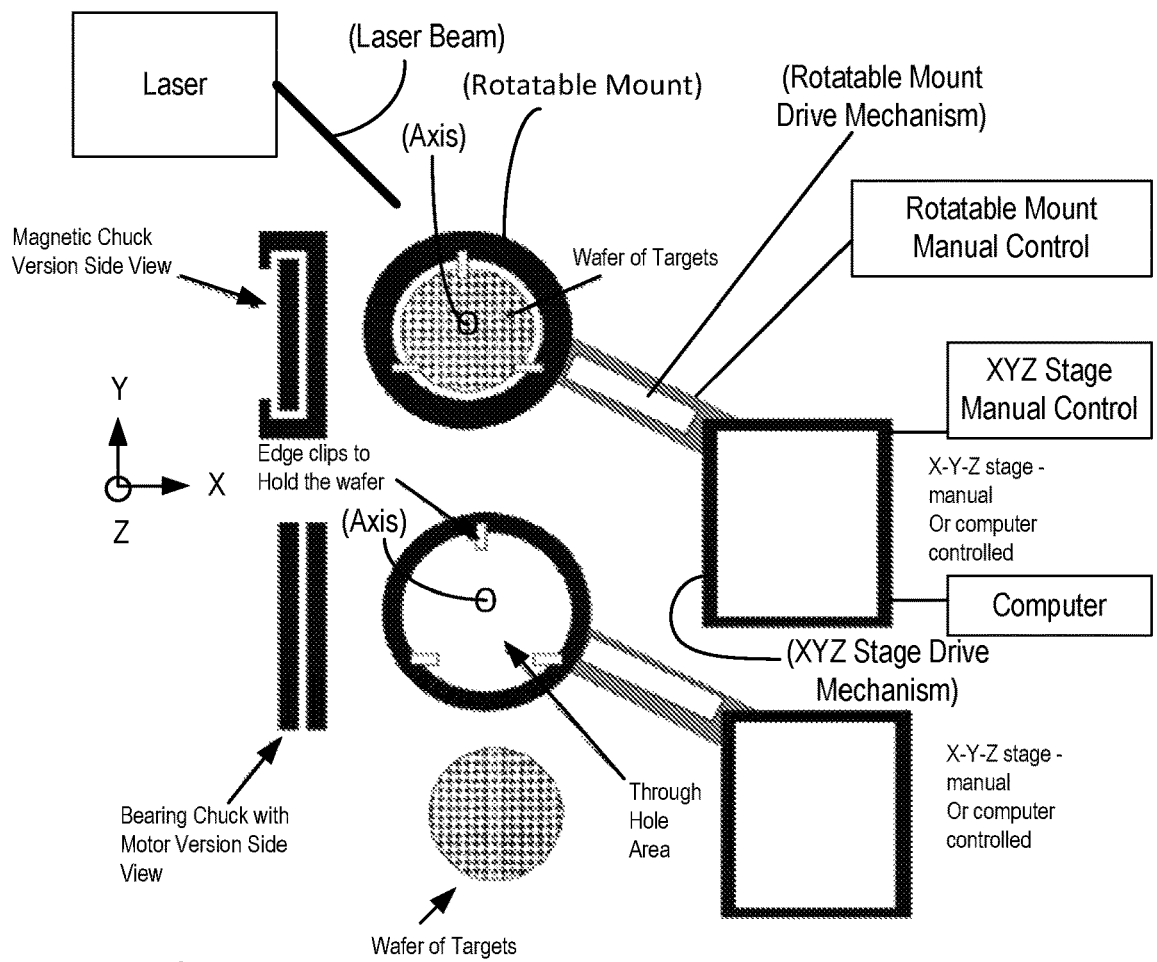
FIG. 49 is a schematic illustration of a target manipulation apparatus according to an embodiment of the present disclosure.
Figure 50:
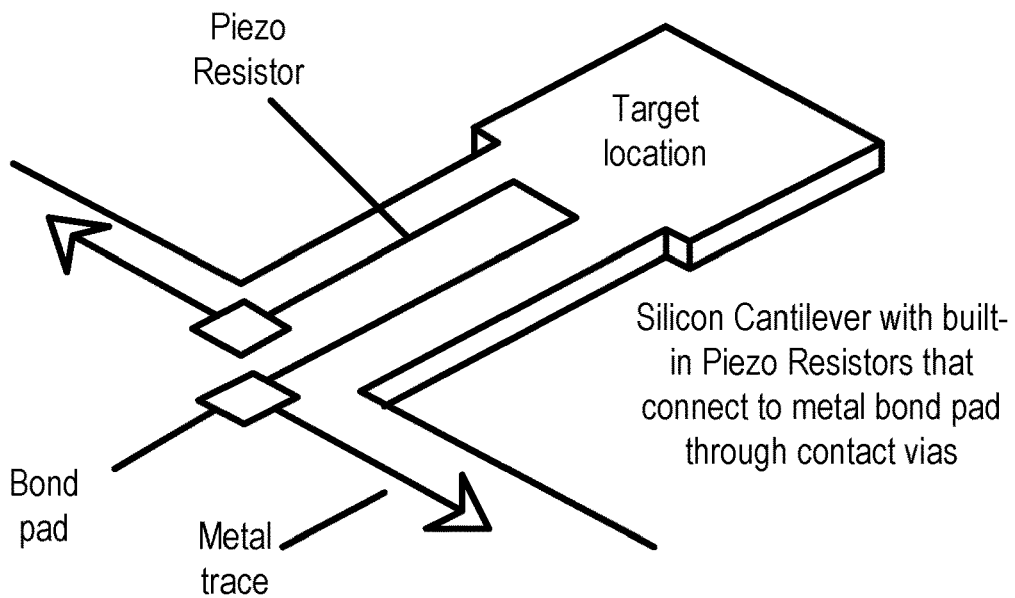
FIG. 50 is a schematic illustration of a target coupled to a piezoresistive material and a conductive lead according to an embodiment of the present disclosure.

FIG. 47 illustrates a top view of a target alignment system producible using the above-described process. FIGS. 48A-48J are various views of different types of targets and target alignment apparatus combinations producible using the above-described technique.

Target Wafer Handling System

Some embodiments of the present disclosure produce multiple targets located on a single substrate, such as a silicon wafer. One advantage of these multiple target wafers is that they can be mechanically manipulated, including in an automated manner. Mechanical manipulation can be useful, for example, in aligning a target with the path of a laser. Mechanical manipulation may also allow multiple targets to be rapidly and successively placed in a desired location, such as the path of a laser. For example, the wafer is positioned to place a first target in the path of a laser. The first target is irradiated by the laser. The wafer is the positioned to place a second target in the path of the laser. This process can be repeated as desired. The wafer may include targets that are all of the same type or targets that are of different types. When different types of targets are included in a single wafer, mechanical manipulation may be used to place a desired target type in a desired location, such as in the path of a laser.

In a particular example, a complete wafer of target die, spaced according to experimental or process needs, are held in a suitable holding device, such as an edge clipped wafer holder on a rotary plate suspended from an xyz-theta stage with an insulating holding rod. The rotary plate is rotated with a suitable actuator, such as a chain or belt drive. A suitable rotary plate mechanism is disclosed in U.S. Pat. No. 6,217,034, incorporated by reference herein to the extent not inconsistent with the present disclosure. Typically the actuator is such that it is kept away from the laser target interaction area. Software and motors are used to control the location of targets on the rotary plate via rotation of the plate and xyz-theta manipulation of the stage, in some examples. Suitable stages, and rotary mechanisms, are available from Newmark Systems, Inc. of Mission Viejo, Calif. In other examples, the rotary plate or stage are manually controlled.

This apparatus can be used, in some examples, to quickly align individual targets on a given wafer between the laser and the subject of interest at slow or high repetition rates and without the need to insert individual targets into a support wafer, or insert individual targets and stalks in front of the laser one or two at a time.

Targets Coupled to Piezoresistor or Conductive Leads

In another aspect of the present disclosure, targets are provided that include a piezoresistor or conductive leads. The piezoresistor, in some cases, is coupled to the conductive leads. In one example, the piezoresistive material is located proximate the target, such as above or below the target. In another example, the piezoresistive material is located on a support structure, such as a cantilever coupling the target to a substrate. The piezoresistive material or conductive material can be deposited during target fabrication, in some examples.

In a particular method, target fabrication includes the step of forming a support structure that connects a target to a substrate. The support structure is a cantilever, in some examples. The support structure is masked to form a pattern into which the piezoresistive material can be deposited. The piezoresistive material is then deposited into the pattern. In another example, a surface of the substrate is coated with the piezoresistive material, the desired portion of the piezoresistive material is masked, and unwanted piezoresistive material is removed, such as by etching. The support structure is masked to form a pattern into which the conductive material can be deposited. The conductive material, such as a conductive metal, is then deposited into the pattern.

In other examples, the conductive material is formed by doping silicon, such as silicon in a support structure or silicon proximate the target. For example, ion bombardment can be used to inject silicon atoms with negative ions, using phosphorus doping, or positive ions, using boron doping. In further examples, the piezoresistive material is formed by modifying the silicon, such as the silicon proximate a target or in a support structure. In a specific example, the silicon modification is doping the silicon, such as using ion bombardment.

Targets with conductive leads or piezoresistive sections can have various advantages. For example, when the leads or piezoresistive material is located in a support structure, current can be applied to the support structure, such as immediately before a target is irradiated. The current causes the support structure to melt, leaving the target suspended in space as it is irradiated. This can reduce interference with the irradiation process or the products thereof. In another example, when the piezoresistive material is located proximate the target, it can be used to apply a positive or negative charge to the target, such as immediately prior to target irradiation. In yet another example, the piezoresistive material, or the conductive material, is used to influence the products of target irradiation, such as to at least partially contain generated electrons, which can enhance proton acceleration.

The disclosed targets can provide a number of advantages. For example, the lithographic techniques used to produce the target may allow many targets to be fabricated and fabricated with consistent properties. Accordingly, the present disclosure may allow targets to be constructed less expensively than using prior techniques. Because of the potentially lower cost, or greater numbers of targets that can be made, such methods may allow the targets to be used in more applications, as well as potentially increasing the quality or quantity of data available from target experiments. In further implementations, the targets can be fabricated with a surrounding support that can help protect the target from damage and aid in handling and positioning the target.

It is to be understood that the above discussion provides a detailed description of various embodiments. The above descriptions will enable those skilled in the art to make many departures from the particular examples described above to provide apparatuses constructed in accordance with the present disclosure. The embodiments are illustrative, and not intended to limit the scope of the present disclosure. The scope of the present disclosure is rather to be determined by the scope of the claims as issued and equivalents thereto.

What is claimed is:

1. A structure for facilitating proton generation, the structure comprising:
   a handling die, the handling die containing an aperture;
   a destructible laser target located in the aperture, the destructible laser target configured to emit protons upon irradiation;
   a support structure for coupling the destructible laser target to the handling die prior to irradiation of the destructible laser target; and
   a piezoresistive element;
   wherein the destructible laser target is configured to be decoupled from the handling die at a time of irradiating the destructible laser target.

2. The structure of claim 1, wherein the support structure laterally couples the destructible laser target to the handling die.

3. The structure of claim 1, wherein at least one of a depth of the aperture, a position of the aperture, and an orientation of the aperture is configured to control a relative alignment of the destructible laser target with a second destructible laser target.

4. The structure of claim 1 comprising at least one other support structure for coupling the destructible laser target to the handling die prior to irradiation of the destructible laser target.

5. The structure of claim 1, wherein the support structure is a cantilever.

6. The structure of claim 5, wherein the support structure has a cross-section with a dimension less than 15 $\mu m^2$.

7. The structure of claim 1, wherein the piezoresistive element is configured to facilitate application of an electric charge to the destructible laser target.

8. The structure of claim 7, further comprising a conductive lead coupled to a piezoresistive element.

9. The structure of claim 7, further comprising a conductive lead configured to influence types of particles emitted upon irradiation of the destructible laser target.

10. The structure of claim 9, wherein the conductive lead is configured to cause electron emission upon irradiation of the destructible laser target.

11. The structure of claim 7, further comprising a conductive lead at least partially located on at least one of the support structure and the handling die.

12. The structure of claim 1, wherein the piezoresistive element is located proximate to the destructible laser target.

13. The structure of claim 12, wherein the piezoresistive element is located at least one of above and below the destructible laser target.

14. The structure of claim 1, wherein the piezoresistive element is configured to facilitate application of an electric charge to the destructible laser target.

15. The structure of claim 14, further configured to facilitate application of the electric charge to the destructible laser target immediately prior to the time of irradiating the destructible laser target.

16. The structure of claim 1, wherein the piezoresistive element is at least partially located on at least one of the support structure and the handling die.

17. The structure of claim 16, wherein the piezoresistive element is configured to facilitate application of an electric current to the support structure.

18. The structure of claim 17, further configured to facilitate application of the electric current to the support structure immediately prior to the time of irradiating the destructible laser target.

19. The structure of claim 17, wherein the piezoresistive element is configured to be heated upon application of the electric current.

20. The structure of claim 1, wherein the piezoresistive element is configured to influence types of particles emitted upon irradiation of the destructible laser target.

21. The structure of claim 20, wherein the piezoresistive element is configured to cause electron emission upon irradiation of the destructible laser target.

* * * * *